(12) United States Patent
Curzan

(10) Patent No.: US 12,412,237 B2
(45) Date of Patent: Sep. 9, 2025

(54) IMAGE PROCESSING FOR OVERSAMPLED INFRARED IMAGING

(71) Applicant: Cyan Systems, Santa Barbara, CA (US)

(72) Inventor: Jon Paul Curzan, Arroyo Grande, CA (US)

(73) Assignee: Cyan Systems, Santa Barbara, CA (US)

( * ) Notice: Subject to any disclaimer, the term of this patent is extended or adjusted under 35 U.S.C. 154(b) by 396 days.

(21) Appl. No.: 17/882,463

(22) Filed: Aug. 5, 2022

(65) Prior Publication Data

US 2023/0041139 A1 Feb. 9, 2023

Related U.S. Application Data

(60) Provisional application No. 63/231,192, filed on Aug. 9, 2021, provisional application No. 63/231,189, filed on Aug. 9, 2021.

(51) Int. Cl.
*G06T 3/40* (2024.01)
*G06T 5/20* (2006.01)

(52) U.S. Cl.
CPC ............... *G06T 3/40* (2013.01); *G06T 5/20* (2013.01); *G06T 2207/10048* (2013.01); *G06T 2207/20016* (2013.01); *G06T 2207/20032* (2013.01)

(58) Field of Classification Search
CPC .... G06T 5/00; G06T 5/20; G06T 3/40; G06T 2207/10048; G06T 2207/20016; G06T 2207/20032; H04N 5/33
See application file for complete search history.

(56) References Cited

U.S. PATENT DOCUMENTS

| | | |
|---|---|---|
| 4,975,864 A | 12/1990 | Sendall |
| 2002/0159648 A1 | 10/2002 | Alderson |
| 2008/0025624 A1 | 1/2008 | Brady |
| 2010/0253855 A1 | 10/2010 | Tener |
| 2017/0195596 A1 | 7/2017 | Vogelsang |
| 2020/0336682 A1 | 10/2020 | Caulfield |

OTHER PUBLICATIONS

Wang, et al. (Point target detection utilizing super-resolution strategy for infrared scanning oversampling system). (Year: 2017).*
Alam et al., Infrared Image Registration and High-Resolution Reconstruction Using Multiple Translationally Shifted Aliased Video Frames, IEEE Transaction on Instrumentation and Measurement, vol. 49, No. 5, Oct. 2000, pp. 915-923.
Elad et al., A Fast Super-Resolution Reconstruction Algorithm for Pure Translational Motion and Common Space-Invariant Blur, IEEE Transaction on Image Processing, vol. 10, No. 8, Aug. 2001, pp. 1187-1193.
Farsiu et al., Fast and Robust Multiframe Super Resolution, IEEE Transaction on Image Processing, vol. 13, No. 10, Oct. 2004, pp. 1327-1344.
Leonardo Drs, Hexablu, 1280-MW 6 μm Cooled Thermal Core, 2018.

(Continued)

*Primary Examiner* — Daniel G Mariam
(74) *Attorney, Agent, or Firm* — Van Pelt, Yi & James LLP

(57) ABSTRACT

A method is described. The method includes receiving oversampled infrared data provided from an infrared pixel array. The method also includes performing at least one of selective median filtering, spatial-temporal filtering, or resolution enhancement for the oversampled infrared data.

18 Claims, 14 Drawing Sheets

(56) References Cited

OTHER PUBLICATIONS

Michaelmas et al., Lecture 3: Image Restoration, 2014.
Mohamed et al., A Collaborative Adaptive Wiener Filter for Image Restoration Using a Spatial-Domain Multi-Patch Correlation Model, Mohamed and Hardie EURASIP Journal on Advances in Signal Processing (2015), pp. 1-23.
Russell C. Hardie, Chapter 1, Super-Resolution Using Adaptive Wiener Filters, University of Dayton eCommons, Electrical and Computer Engineering Faculty Publications, 2010, pp. 3-30.

* cited by examiner

Input

| | | | | | | | | | |
|---|---|---|---|---|---|---|---|---|---|
| 25 | 28 | 31 | 34 | 37 | 40 | 43 | 46 | 49 | 45 |
| 27 | 30 | 33 | 36 | 39 | 42 | 45 | 48 | 44 | 40 |
| 29 | 32 | 5  | 38 | 41 | 44 | 47 | 43 | 39 | 35 |
| 31 | 34 | 37 | 40 | 43 | 46 | 42 | 40 | 36 | 32 |
| 33 | 36 | 40 | 43 | 46 | 42 | 38 | 34 | 30 | 26 |
| 35 | 38 | 41 | 44 | 40 | 36 | 32 | 28 | 24 | 20 |
| 37 | 40 | 43 | 39 | 35 | 31 | 60 | 23 | 19 | 15 |
| 39 | 42 | 38 | 34 | 30 | 26 | 22 | 18 | 14 | 10 |
| 41 | 37 | 33 | 29 | 35 | 21 | 17 | 13 | 9  | 5  |
| 39 | 35 | 31 | 27 | 23 | 19 | 15 | 11 | 7  | 3  |

A → (row 3, col 3); B → (row 7, col 7); C → (row 9, col 1); D → (row 9, col 4/5)

Output

| | | | | | | | | | |
|---|---|---|---|---|---|---|---|---|---|
| 28 | 29 | 32 | 35 | 38 | 41 | 44 | 46 | 46 | 45 |
| 29 | 29 | 32 | 36 | 39 | 42 | 44 | 45 | 44 | 42 |
| 31 | 31 | 34 | 38 | 41 | 43 | 44 | 43 | 40 | 38 |
| 33 | 33 | 37 | 40 | 43 | 43 | 42 | 39 | 35 | 34 |
| 35 | 36 | 40 | 41 | 43 | 42 | 38 | 34 | 30 | 28 |
| 37 | 38 | 40 | 41 | 40 | 38 | 34 | 30 | 24 | 22 |
| 39 | 39 | 40 | 39 | 35 | 32 | 28 | 23 | 19 | 17 |
| 40 | 39 | 38 | 35 | 31 | 30 | 22 | 18 | 14 | 12 |
| 39 | 38 | 34 | 31 | 27 | 22 | 18 | 14 | 10 | 8  |
| 38 | 36 | 32 | 30 | 25 | 20 | 16 | 12 | 8  | 6  |

- 402: Determine Median Using Nearby Pixels
- 404: Determine Whether Pixel Output is Within Threshold(s) of Median
- 406: Replace Pixel Output with Median if Not Within Threshold(s)
- 408: Optionally Repeat 402, 404, and 406 for Remaining Pixels in Frame
- 410: Optionally Repeat 402, 404, 406, and 408 for Remaining Frames

FIG. 4

Input

| 25 | 28 | 31 | 34 | 37 | 40 | 43 | 46 | 49 | 45 |
|----|----|----|----|----|----|----|----|----|----|
| 27 | 30 | 33 | 36 | 39 | 42 | 45 | 48 | 44 | 40 |
| 29 | 32 | 5  | 38 | 41 | 44 | 47 | 43 | 39 | 35 |
| 31 | 34 | 37 | 40 | 43 | 46 | 42 | 40 | 36 | 32 |
| 33 | 36 | 40 | 43 | 46 | 42 | 38 | 34 | 30 | 26 |
| 35 | 38 | 41 | 44 | 40 | 36 | 32 | 28 | 24 | 20 |
| 37 | 40 | 43 | 39 | 35 | 31 | 60 | 23 | 19 | 15 |
| 39 | 42 | 38 | 34 | 30 | 26 | 22 | 18 | 14 | 10 |
| 41 | 37 | 33 | 29 | 35 | 21 | 17 | 13 | 9  | 5  |
| 39 | 35 | 31 | 27 | 23 | 19 | 15 | 11 | 7  | 3  |

A → row 3, B → row 7, C → row 9, D → row 10

Output

| 25 | 28 | 31 | 34 | 37 | 40 | 43 | 46 | 49 | 45 |
|----|----|----|----|----|----|----|----|----|----|
| 27 | 30 | 33 | 36 | 39 | 42 | 45 | 48 | 44 | 40 |
| 29 | 32 | 34 | 38 | 41 | 44 | 47 | 43 | 39 | 35 |
| 31 | 34 | 37 | 40 | 43 | 46 | 42 | 40 | 36 | 32 |
| 33 | 36 | 40 | 43 | 46 | 42 | 38 | 34 | 30 | 26 |
| 35 | 38 | 41 | 44 | 40 | 36 | 32 | 28 | 24 | 20 |
| 37 | 40 | 43 | 39 | 35 | 31 | 28 | 23 | 19 | 15 |
| 39 | 42 | 38 | 34 | 30 | 26 | 22 | 18 | 14 | 10 |
| 41 | 37 | 33 | 29 | 35 | 21 | 17 | 13 | 9  | 5  |
| 39 | 35 | 31 | 27 | 23 | 19 | 15 | 11 | 7  | 3  |

- 602 Determine Contrast
- 604 Provide Weighted Average of Pixel Based on Contrast
- 606 Selectively Replace Pixel Output with Weighted Average
- 608 Optionally Repeat 602, 604, and 606 for Remaining Pixels in Frame
- 610 Optionally Repeat 602, 604, 606, and 608 for Remaining Frames

FIG. 6

IMAGE PROCESSING FOR OVERSAMPLED INFRARED IMAGING

CROSS REFERENCE TO OTHER APPLICATIONS

This application claims priority to U.S. Provisional Patent Application No. 63/231,189 entitled RESOLUTION ENHANCEMENT FOR OVERSAMPLING IR CAMERAS filed Aug. 9, 2021 and U.S. Provisional Patent Application No. 63/231,192 entitled SELECTIVE MEDIAN FILTERING FOR INFRARED IMAGE DATA filed Aug. 9, 2021 both of which are incorporated herein by reference for all purposes.

BACKGROUND OF THE INVENTION

Current infrared radiation (IR) imaging systems include IR detection systems and IR image outputs systems. IR detection systems include a lens, a detector having an array of pixels and a readout integrated circuit (ROIC). The lens focuses infrared light onto pixels in the detector array. Current IR pixel arrays typically have pixels having a pitch of ten micrometer or more. In conventional detection systems, therefore the lens typically focuses a spot of infrared light onto a single pixel. The pixels provide an electrical signal based upon the light received and provide this signal to the ROIC, which is then output to the IR image output system.

Although current IR imaging systems allow for IR images to be provided, improvements are desired. For example, noise sources for the pixels in the array can adversely affect images. Multiple noise sources having varying causes exist in IR detectors. For example, noise sources may include 1/f noise, blinking pixels, random telegraph noise, dead (i.e. inoperative) pixels, intermittent pixels, and/or shorted pixels. Noise for the IR detectors may vary between frames and/or subframes, may be variable noise that has "blinking" (i.e. where such blinking is periodic and appears somewhat random), or may be fixed noise. Other noise sources may be due to signal coupling. Such noise sources may have different beat patterns, may be "off" for a period of time and then "on" again based on the signal background. Noise may also be due to temperature fluctuations in the electronics, sampling variation, and/or other influences. The noise that is different from the sensors' photon noise often is above the expected noise of normal pixels which feature temporal noise from photon random arrival statistics, referred to as photon shot noise. In very low photon levels, the noise takes on a different statistical nature. Sometime different noise sources that occur less frequently in for example an imager is called "anomalous noise". Noise and other issues may, therefore, adversely affect imaging in an IR imaging systems. A mechanism for providing an improved infrared imaging system is desired.

BRIEF DESCRIPTION OF THE DRAWINGS

Various embodiments of the invention are disclosed in the following detailed description and the accompanying drawings.

FIG. 3 is a diagram depicting classical median filtering.

FIG. 4 is a flow-chart of an embodiment of a method for performing selective median filtering.

FIG. 5 is a diagram illustrating one embodiment of selective median filtering.

FIG. 6 is a flow-chart of an embodiment of a method for performing spatial-temporal filtering.

DETAILED DESCRIPTION

Figure 1A:
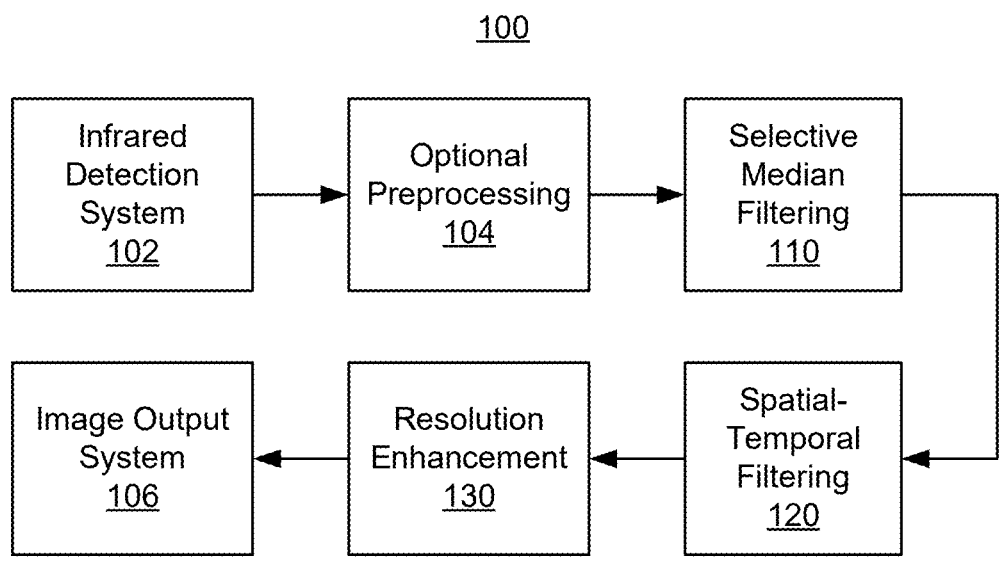
FIGS. 1A-1B are diagrams depicting an embodiment of an infrared imaging system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method is described. The method includes receiving oversampled infrared data provided from an infrared pixel array. In some embodiments, the infrared pixel array has a pitch of not more than ten micrometers. In some such embodiments, the pitch is not more than five micrometers. The method also includes performing at least one of selective median filtering, (or other analogous non-linear filtering also used for replacing suspected noise peaks) spatial-temporal filtering (for mitigating residual spatial and statistical temporal noise), or resolution enhancement for the oversampled infrared data. In some embodiments, the selective median filtering (if carried out) is performed before the spatial-temporal filtering and the spatial-temporal filtering (if carried out) is performed before the resolution enhancement. Thus, the selective median filtering (if carried out) may be performed before the resolution enhancement.

The selective median filtering includes ascertaining a median output for a set of nearby pixels of a particular pixel in the infrared pixel array. For example, the nearby pixels may include the eight nearest neighbors of the particular pixel (i.e. the set of nearby pixels and the particular pixel form a three-by-three array). In another example, the nearby pixels and particular pixel might form a five-by-five array (i.e. the pixel, the nearest neighbors and the next nearest neighbors) with the particular pixel at the center. It is determined whether the output of the particular pixel is at least one of greater than a minimum threshold lower than the median output or less than a maximum threshold greater than the median output. The output of the particular pixel is replaced if the output of the particular pixel is not greater than the minimum threshold lower than the median output and/or not less than a maximum threshold greater than the median output. Thus, in some embodiments if the output of the pixel does not satisfy: median−minimum threshold<output<median+maximum threshold, then the pixel is output is replaced by the median. In some embodiments, if the output of the pixel does not satisfy: median−minimum threshold≤output≤median+maximum threshold, then the pixel is output is replaced by the median.

The spatial-temporal filtering may also include determining a contrast for a particular pixel and a nearby pixels for the particular pixel in the infrared pixel array. The particular pixel and nearby pixels may form a three-by-three array with the particular pixel at the center, a five-by-five array with the particular pixel at the center, or another array. Spatial-temporal filtering may also include providing a weighted average of the particular pixel and the nearby pixels based on the contrast. The output of the particular pixel is replaced with the weighted average. In some embodiments, the contrast varies between low (or very low or zero) contrast and high (or very high) contrast. In such embodiments, a higher contrast corresponds to lower weights for the nearby pixels. Similarly, a lower contrast may correspond to higher weights for the nearby pixels.

The resolution enhancement may include determining a point spread function (PSF) blur based on a PSF of a lens for an infrared detection system including the lens and the infrared pixel array. The resolution enhancement also includes applying, to the oversampled infrared data, an inverse filter using the PSF blur to provide filtered infrared data. The infrared image corresponding to the filtered infrared data is output. In some embodiments, the inverse filter is a Wiener filter. Performing the resolution enhancement may further include up-sampling captured oversampled infrared data to provide the oversampled infrared data. In such embodiments, the PSF blur may be up-sampled by the same factor to retain a 1:1 pixel correspondence between the input data and the inverse filter. The resolution enhancement may also include down-sampling the filtered infrared data to provide down-sampled, filtered infrared data. The infrared image is based on the down-sampled, filtered infrared data.

A computer program product embodied in a non-transitory computer readable medium is described. The computer program product includes computer instructions for receiving oversampled infrared data provided from an infrared pixel array and performing at least one of selective median filtering, spatial-temporal filtering, or resolution enhancement for the oversampled infrared data. In some embodiments, the computer instructions further include instructions which perform selective median filtering before the spatial-temporal filtering and perform spatial-temporal filtering before the resolution enhancement. In some embodiments, the computer instructions for performing selective median filtering, spatial-temporal filtering, and resolution enhancement The computer instructions for selective median filtering include computer instructions for ascertaining a median output for a set of nearby pixels of a particular pixel in the infrared pixel array; determining whether the output of the particular pixel is at least one of greater than a minimum threshold lower than the median output or less than a maximum threshold greater than the median output; and replacing the output of the particular pixel if the output of the particular pixel is not the at least one of greater than the minimum threshold lower than the median output or less than a maximum threshold greater than the median output. The computer instructions for spatial-temporal filtering may also include computer instructions for determining a contrast for a particular pixel and a plurality of nearby pixels for the particular pixel in the infrared pixel array and providing a weighted average of the particular pixel and the plurality of nearby pixels based on the contrast. The output of the particular pixel is replaced with the weighted average. The computer instructions for resolution enhancement may include computer instructions for determining a PSF blur based on a PSF of a lens for an infrared detection system including the lens and the infrared pixel array and applying, to the oversampled infrared data, an inverse filter using the PSF blur to provide filtered infrared data. The infrared image corresponding to the filtered infrared data is output.

Figure 1B:
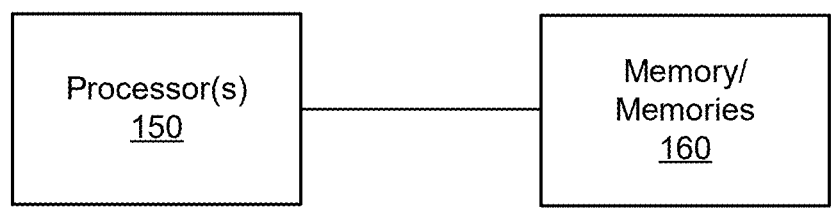

FIGS. 1A and 1B are diagrams depicting an embodiment of infrared (IR) imaging system 100 and portions of hardware 150 and 160 for infrared imaging system 100. For clarity, only some portions of IR imaging system 100 are shown. As indicated in FIG. 1A, IR imaging system 100 includes IR detection system 102, optional preprocessing 104, selective median filtering 110, spatial temporal filtering 120, resolution enhancement 130, and image output system 106. Portions of processing, such as optional preprocessing 104, selective median filtering 110, spatial-temporal filtering 120, and resolution enhancement 110 may be carried out using processor(s) 150 and memory or memories 160. For example, memory/memories 160 may include nonvolatile memory, read only memory, and/or other memory at which data, computer instructions which are provided to and carried out by processor(s) 150, and/or other items may be stored and/or used.

Referring to FIG. 1A, IR detection system 102 includes one or more IR pixel arrays, lens(es), and an output circuit (e.g. a readout integrated circuit, or ROIC). IR detection system 102 provides oversampled IR data. An embodiment of IR detection system 102 is described below with respect to FIGS. 11A-13. Optional processing 104 may include some corrections to data from IR detection system 102. For example, optional processing 104 may perform two-point nonuniformity correction (NUC) and bad pixel replacement (BPR). In some embodiments, the two-point NUC and BPR are analogous to processes carried out in conventional IR imaging systems. Such processes may be performed using processor(s) 150 and memory/memories 160. In addition, optional processing may include additional preprocessing. For example, a one-point NUC may be performed.

Selective median filtering 110, spatial-temporal filtering 120, and resolution enhancement 130 are all shown as part of IR imaging system 100. In some embodiments, however, one or more of selective median filtering 110, spatial-temporal resolution 120, and resolution enhancement 130 may be omitted. For example, IR imaging system 100 may perform selective median filtering 110 only, spatial-temporal filtering 120 only, resolution enhancement 130 only, or some combination of two or more of selective median filtering 110, spatial-temporal filtering 120, and resolution enhancement 130. Selective median filtering 110, spatial-temporal filtering 120, and resolution enhancement 130 use oversampled data from IR detection system 102. For example, the oversampled IR data from IR detection system 102 undergoes preprocessing followed (in order in some embodiments) by one or more of selective median filtering 110, spatial-temporal filtering 120, and resolution enhancement 130. The filtered (oversampled) IR data is provided to image output system 106 for additional processing (if any) (e.g. compression and/or digital zoom) and may be output on a display for image output system 106.

Selective median filtering 110 replaces the output of a pixel in the IR pixel array of IR detection system 102 with the median value of a set of nearby pixels (e.g. nearest neighbors for a 3×3 array of pixels or nearest and next-nearest neighbors for a 5×5 array of pixels) if the output of the pixel is within a particular range. Selective median filtering 110 thus determines a median output for a set of nearby pixels of a particular pixel in the IR pixel array. For example, the median output may be determined for the eight nearest neighbors of the pixel (i.e. for a three-by-three array of pixels with the pixel at the center). In another example, median output may be determined for the twenty-four closest pixels to the center pixel of a five-by-five array. In some embodiments, the median calculation includes the center pixel (i.e. the pixel having the output that may be replaced). Selective median filtering 110 also determines whether the output of the pixel is greater than a minimum threshold lower than the median output and/or less than a maximum threshold greater than the median output. The output of the pixel is replaced if the output of the particular pixel is not greater than the minimum threshold lower than the median output (i.e. output<median−minimum threshold) and/or not less than a maximum threshold greater than the median output (i.e. output>median+maximum threshold). In some embodiments, if the output of the pixel does not satisfy: median−minimum threshold≤output≤median+maximum threshold, then the pixel is output is replaced by the median. Stated differently, if the output of the particular pixel is not within a corresponding intensity range around the median, the pixel output is replaced with the median. In some embodiments, the minimum and maximum thresholds are the same. In other embodiments, the minimum threshold may be different from the maximum threshold.

Spatial-temporal filtering 120 replaces the output of a pixel with an average (e.g. a weighted average) of surrounding pixels if the contrast for the region surrounding the pixel is sufficiently low. Spatial-temporal filtering 120 determines a contrast for a particular pixel and nearby pixels in the IR pixel array. For example, the contrast for the pixel may be determined based on the outputs of the eight nearby pixels for the pixel in a three-by-three array with the pixel at its center. In another example, the contrast for the pixel may be determined based on the outputs of the twenty-four nearby pixels for a central pixel in a five-by-five array. Other arrays including another number of pixels in the same or a different (e.g. not square) configuration may be used. The arrays for spatial-temporal filtering 120 may be the same size or a different size from the arrays used for selective median filtering 11. Spatial-temporal filtering 120 may also determine a weighted average of the pixel and the nearby pixels based on the contrast. For example, nearby pixels located horizontally and/or vertically from the pixel may have a higher weight than nearby pixels located diagonally. The output of the pixel may be replaced with the weighted average. For example, if the contrast is below a particular threshold, a weighted average may replace the output of the pixel. If the contrast is below a lower threshold, the output of the pixel may be replaced by a different weighted average. In some embodiments, therefore, the contrast varies between low contrast and high contrast. In such embodiments, a higher contrast corresponds to lower weights for the nearby pixels (i.e. more or all weight given to the pixel). Similarly, a lower contrast corresponds to higher weights for the nearby pixels (i.e. less or no weight given to the pixel).

Resolution enhancement 130 uses a point spread function (PSF) to improve resolution. In particular, resolution enhancement 130 determines the PSF blur based on a PSF of the lens for IR detection system 102 (i.e. the detection system including the lens and the IR pixel array). Resolution enhancement 130 applies, to the oversampled (optionally filtered) IR data, an inverse filter using the PSF blur. Thus, filtered IR data may be provided to image output system 106. In some embodiments, the inverse filter used by resolution enhancement 130 is a Wiener filter. Other filters might be used. In some embodiments, up-sampling of the over-sampled (optionally processed and/or filtered) data input to the resolution enhancement data and down-sampling of the final, filtered output may be performed. The resolution enhancement may also include down-sampling the filtered infrared data to provide down-sampled, filtered infrared data. The infrared image provided by IR imaging system 100 may then be based on the down-sampled, filtered infrared data.

IR image output system 106 receives the filtered, optionally processed, oversampled data from resolution enhancement 130. If resolution enhancement 130 is omitted, then IR image output system 106 may obtain data from spatial-temporal filtering 110. IR image output system 106 may include a display for outputting IR image data. The output may be in the form of individual images, a video stream, or other rendered images. In some embodiments, IR image output system 106 also performs some additional processing, such as compressing the data stream. In some embodiments, target detection and/or other techniques using the processed IR image data may be incorporated into IR image output system 102.

Figure 2A:
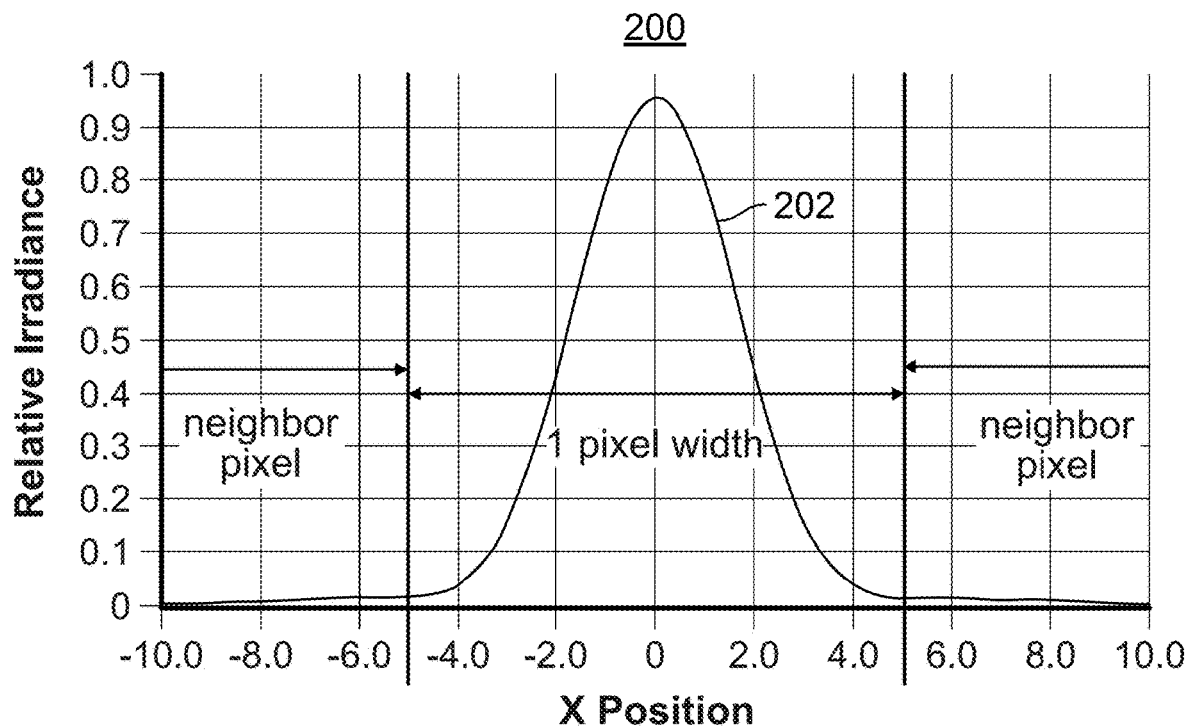
FIGS. 2A-2B are graphs illustrating the difference between undersampled and oversampled infrared data.
Figure 2B:
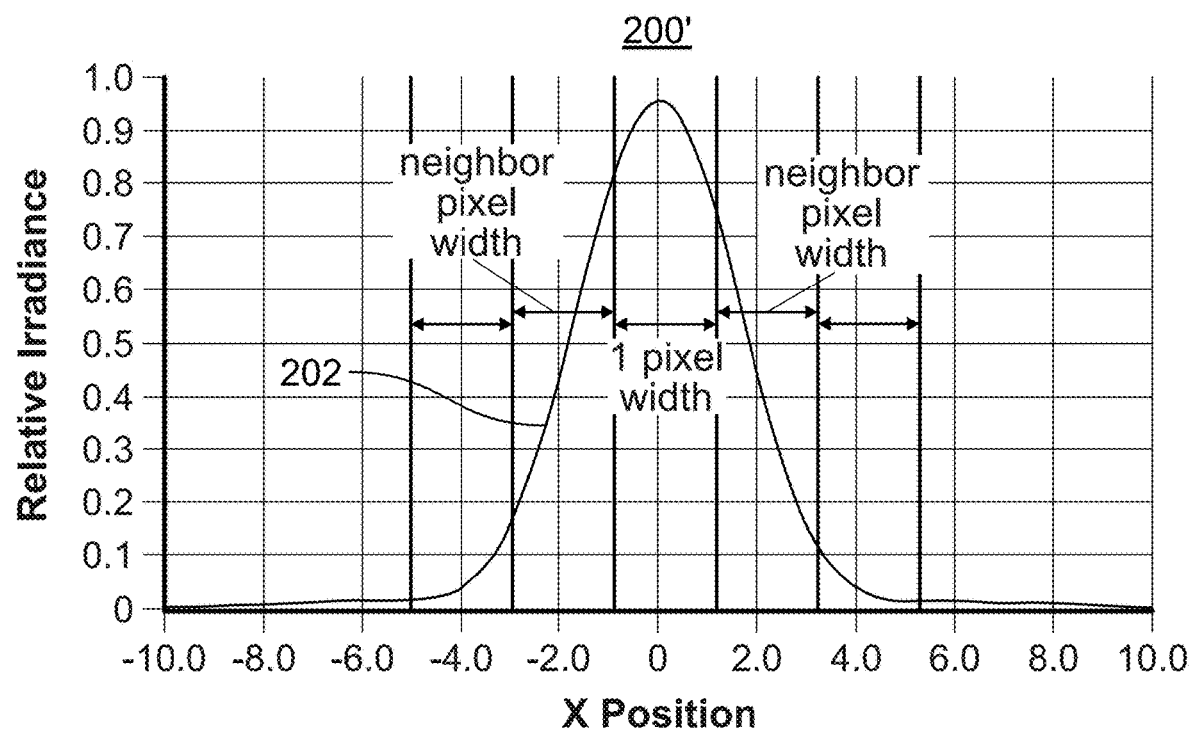

IR imaging system 100 detects and uses oversampled IR data. FIGS. 2A-2B are graphs 200 and 200' illustrating the difference between undersampled and oversampled data. For example, FIG. 2A shows an illustration of an undersampled pixel architecture in which the lens PSF 202 (the Gaussian shaped curve) falls entirely within one pixel width. In some embodiments, undersampled data includes data for which the intensity values of the lens PSF at the edges of the pixel are not more than ten percent of the maximum intensity values near the pixel center. In some embodiments, undersampled data includes data for which the intensity values of the lens PSF at the edges of the pixel are not more than five percent of the maximum intensity values near the pixel center. For example, the pixel width for graph 200 may be ten micrometers (corresponding to a pixel pitch of ten micrometers) or more. In this scenario, there is no sampled "blur" pattern of the lens so there is no way to deblur given a single static frame. This situation is present in infrared images. Consequently, resolution enhancement may not be able to be performed. Similarly, the intensity change due to the incident power from a true point source imaged onto the array would affect only one pixel. Thus, it may be difficult or impossible to discern a real signal from a noise event. In other words all pixel intensities within a neighborhood are spatiotemporally uncorrelated. Thus, such infrared pixel arrays are poor candidates for median filtering, spatial temporal filtering, and/or resolution enhancement described herein. IR imaging system 100 and IR detection system 102 thus provide and utilize oversampled data.

FIG. 2B shows an illustration of an oversampled pixel architecture in which the lens PSF 202 spans multiple pixel widths. Stated differently, oversampling may occur where for a point target, the energy from the lens PSF impinges upon multiple pixels. Stated differently, the size of PSF 202 is larger than the pixel size, as indicated in FIG. 2B. Similarly, oversampling may occur where the Airy disk of the lens spot covers at least two pixels. Thus, the IR detection system for the configuration shown in FIG. 2B, the system modulation transfer function (MTF) may be limited by the lens (or other factors) rather than the pixel pitch. In the example shown in graph 200', lens PSF 202 spans five pixels. In other embodiments, lens PSF 202 may span a different number of pixels that is greater than one. For example, in some embodiments, lens PSF 202 may span two pixels, three pixels, four pixels, or more. This may correspond to pixels in the pixel array of IR detection system 102 having a pitch of not more than ten micrometers. In some embodiments, the pixels in IR detection system 102 have a pitch of not more than five micrometers. In some embodiments, the pixel pitch of IR detection system 102 is not more than two micrometers. Other pixel pitches for which IR data is oversampled are possible. In this scenario the "blur" of the lens can sampled and therefore can be deblurred given only a single frame. Similarly, a true point source imaged onto the array of FIG. 2B would affect not only the center pixel intensity but neighboring pixels with a lesser intensity change, according to the PSF profile. In this embodiment, the point source intensity is distributed across five pixels. This energy profile can be taken advantage of to discern real signals from noise events, as a single pixel fails to show a significant change in intensity without its neighborhood being affected to some degree by the same real signal. In other words, there is spatiotemporal correlation among pixels within a neighborhood. As the PSF becomes wider relative to the pixel width, the incident power becomes distributed among a larger pixel neighborhood, increasing this effect. A selective median filter threshold (described with respect to FIGS. 3-5) for selective median filtering can be based on this energy distribution characteristic to avoid replacing pixels which have not experienced noise events. Thus, an oversampled infrared pixel array may be a good candidate for selective median filtering.

Thus, using IR imaging system 100, oversampled IR data may be collected and appropriately processed. Stated differently, selective median filtering, spatial-temporal filtering, and/or resolution enhancement may be performed. Consequently, IR images having improved resolution may be generated. In some embodiments, the processing of the oversampled IR data may occur substantially in real time. As a result, a video feed of IR imaging data and that has improved resolution may be provided. Consequently, target detection and other applications of the IR data may be improved.

FIGS. 3-5 describe an embodiment of selective median filtering. Selective median filtering may be used to correct for defects in the IR pixel array of an IR detection system, such as IR detection system 102. Optical imaging arrays can suffer from random real-time temporal or spatial pixel defects even after performing a two-point NUC (e.g. by optional preprocessing 104). These defects can take the form of residual "bad" pixels which have experienced gain/offset drift after NUC, pixels which get hit with either random or system-correlated spike noise (e.g. salt/pepper noise) before A/D conversion due to electrical interference, pixels which exhibit low rate 1/f noise, random telegraph noise, intermittent pixels, shorted pixels, and/or other causes. Treating each frame independently, all single pixel defects, whether temporal or spatial in origin, can be regarded as spatial noise relative to its local neighborhood. For images in the optical wavelength range, an image processing technique to clean up such noise-corrupted images after acquisition is to pass a median filter over the entire frame of pixels. For live video this may entail performing selective median filtering operation to every frame in real time. Because IR detection system 102 provides oversampled IR data (e.g. through the use of small pixels and the lens PSF falling on multiple pixels), intensity information is spread (or oversampled) over multiple pixels (e.g. a local 3×3 array of nine pixels or a local 5×5 array of twenty-five pixels with the pixel of interest at the center of the array). Selective median filtering described herein may allow for the substitution described herein without significant loss of spatial information. This is particularly true for only 1-2 pixels being substituted within a given 3×3 pixel (or 5×5 pixel) region. The regions of pixels can be larger or smaller depending on the size of the pixels and the size of the optical point spread function.

Other methods for handling random temporal single pixel defects in either undersampled or oversampled architectures, defects such as low rate 1/f noise or flickering pixels, may involve statistical analysis of every pixel intensity over an extended period of time which increases computational complexity and memory storage requirements and may contribute to image latency. Such methods may, therefore, be undesirable.

Classical median filtering may be used in traditional optical image processing, but is inappropriate for conventional IR imaging that uses undersampled data. In classical median filtering, every pixel is replaced by the median value from its N×N neighborhood, i.e., 9 neighbors for a 3×3 kernel, 25 neighbors for a 5×5 kernel, etc., and results in a high probability that most pixels are in fact replaced with another value taken from their neighborhood regardless of whether the pixel was actually "bad" to begin with.

For example, FIG. 3 shows an illustration of classical median filtering, using a 3×3 kernel applied to a 10×10 input array of pixels. For reasons described below, such classical median filtering is inappropriate for most IR data, which is undersampled, and thus inappropriate for use in most IR imaging systems. The "Input" side of FIG. 3 indicates the raw image data, while the "Output" side of FIG. 3 indicates the image data after processing using classical median filtering. Pixels A and B are "bad" pixels with excessively low value (pixel A has a value of 5) or high value (pixel B has a value of 60). The variation in values may be due to noise. Item C (shaded) highlights a pixel value peak running diagonally across most of the array. Item D is a "good" pixel with local maximum value. The output array on the right side of FIG. 3 indicates that while a classical median filter correctly replaces the two "bad" pixels, it also reduces or "blurs" the peaks in addition to altering the values of pixels not needing replacement.

Based solely on pixel intensity levels resulting from static or single-frame scene content, with an undersampled pixel architecture it may be impossible to know whether a high or low pixel value compared to its nearest neighbors is genuine or due to defect. Thus, all pixels are susceptible to being replaced in favor of reducing "bad" pixels, i.e. spatial noise, and the result is a noticeably blurred frame. For example, for pixel arrays used in infrared imaging (e.g. for wavelengths on the order of 700 nanometers through 1 millimeter in some embodiments, and one micrometer through fifteen micrometers in some such embodiments), the pixel pitch for a conventional system is typically on the order of ten micrometers or more. Infrared image data from such infrared pixel arrays is typically undersampled. Thus, classical median filtering is inappropriate for use with such infrared image arrays. Stated differently, data for all pixels, whether "bad" (e.g. pixel value due to noise) or "good" (e.g. pixel value due to actual infrared light) may be replaced by median values.

This shortcoming is present even with oversampled pixel arrays, i.e., applying the classical median filter can lead to blur because every local maxima and minima is replaced with a value that is closer in intensity to the neighborhood average, yielding a result similar to a box filter of equivalent size. Thus, classical median filtering suffers from drawbacks even in the context of oversampled IR data.

FIG. 4 depicts an embodiment of method 400 for performing selective median filtering for infrared pixels analogous to those described in the context of FIGS. 1A and 5. Although described in the context of a median, the method of FIG. 4 may use another mean. Method 400 may be performed by using one or more processors to execute computer instructions on a non-transitory computer program product or medium (which may be stored on a memory or memories), such as processors 150, memory/memories 160 and/or selective median filtering 110 of IR imaging system 100. Further, in some embodiments, method 400 is performed for oversampled IR data. For example, method 400 may be used for IR imaging systems 100 having a pixel pitch not exceeding ten micrometers, and not exceeding five micrometers in some embodiments.

The median is ascertained using nearby pixels, at 402. In some embodiments, the median is determined for the kernel (e.g. a 3×3 array of pixels or a 5×5 array of pixels). In such embodiments, the median is determined using nearby pixels and the central pixel for which data may be replaced. In other embodiments, only nearby pixels are used. The nearby pixels may include nearest neighbors, next nearest neighbors, and/or other nearby pixels.

It is determined whether the pixel output for the pixel of interest (e.g. the central pixel of the kernel) is within the minimum and/or maximum thresholds of the median, at 404. If the pixel output is not within the threshold(s) of the median, then the pixel output is replaced with the median, at 406. However, if the pixel output is within the threshold(s) of the median, then the pixel value is not replaced. This process may be repeated for remaining pixels in a frame at 408, and for multiple frames in a video, at 410. Thus, using the method of FIG. 3A, infrared data may be processed and image quality for infrared images improved.

Method 400 and analogous filtering described herein may be used in connection with an infrared pixel array (e.g. within IR detection system 102). However, conventional infrared pixel arrays are undersampled. Consequently, classical median filtering is not used in connection with such infrared arrays.

In some embodiments, a selective median filter achieves the intended benefits of median filtering on a two-dimensional image without significant blur, using global and local neighborhood pixel statistics, when that image is from an array with oversampling pixel architecture. Stated differently, the infrared image quality may be improved without introducing significant blur.

For example, FIG. 5 shows an illustration of an embodiment of selective median filtering, using method 400 and a 3×3 kernel applied to a 10×10 input array. The values for the pixels in the array are the same as in FIG. 3. Thus, the results of method 400 as shown in FIG. 5 may be compared to those in FIG. 3. Pixels A, B, and D and item C are analogous to those in FIG. 3. Thus, pixels A and B are "bad" pixels with excessively low value (5 for pixel A) or high value (60 for pixel B) that may be due to noise. Item C shading highlights a pixel value peak running across part the array. Pixel D is a "good" pixel with neighborhood maximum value. FIG. 5 is described in the context of a median. However, in some embodiments, another mean, such as an average, may be used.

A 3×3 kernel is used for determining a median for a pixel for the embodiment depicted in FIG. 5. Stated differently, the nearby pixels are the eight pixels surrounding a central (ninth) pixel in the kernel. The central pixel is the pixel for which the value may be replaced. In some embodiments, another kernel (e.g. a 5×5 kernel using nearest and next nearest neighbors to the central pixel) may be used. In the embodiment shown, the median is determined from all of the pixels in the kernel (i.e. the nearby eight pixels and the central pixel), at 402. In some embodiments, the mean may be determined using only nearby pixels (e.g. omitting the central pixel). For pixel A, the median determined at 402 is 34. In some embodiments, the threshold(s) may be determined based on the noise in the system. For example, the maximum and/or minimum threshold may be determined by a multiple (e.g. multiplied by one or more) of the temporal rms (root mean square) noise plus an intensity offset. In the embodiment shown, the minimum and maximum thresholds are both 12 (e.g. a differential noise of 4 plus an offset of 8). In some embodiments, the minimum and maximum thresholds may differ. In the embodiment illustrated in FIG. 5, both the minimum and maximum thresholds are used. In such embodiments, the output of a pixel is replaced by the median if the output of the pixel is greater than the median plus the maximum threshold or if the output of the pixel is less than the median minus the minimum threshold. Thus, for the case shown in FIG. 2, if the output of a pixel is within 12 of the median, the value will not be replaced. In some embodiments, only the minimum threshold is used. In such embodiments, the output of the pixel is replaced only if the output is less than the median minus the minimum threshold. In some embodiments, only the maximum threshold is used. In such embodiments, the output of the pixel is replaced by the median only if the output is greater than the median plus the maximum threshold. Because pixel A has an output (5) that is less than the median minus the minimum threshold (i.e. less than 34−12=22) the output of pixel A is replaced by 34, at 406. This can be seen in the Output array. For pixel B, the median for the kernel is 28. The output of pixel B is replaced by the median at 406 because pixel B has an output (60) that is greater than the median plus the maximum threshold (i.e. greater than 28+12=40). This is seen in the output array. For pixel D, however, the median for the kernel is 27. The output of pixel D is not replaced at 406 because the pixel D has an output (35) that is less than the median plus the maximum threshold (27+12=39) and greater than the median minus the minimum threshold (27−12=15). This is illustrated by the output array. The output array demonstrates that using a selection threshold this filter correctly replaces the two "bad" pixels while preserving all other "good" pixels including maximum or minimum values that were replaced by classical median filter shown in FIG. 3.

A mechanism to substantially reduce the blur resulting from selective median filtering is to base the pixel replacement on a test criterion. An imaging array that is oversampling the scene content, rather than undersampling, contains local statistical information that can be leveraged to improve a selective median filtering operation. Taking advantage of oversampled pixel architecture such that it is known from the optical transfer function (e.g. the PSF), that there are not pixels in excess of some theoretical number of counts away from any of their nearest neighbors, unless they are previously defined to be "non-operable" or "bad" pixels. This feature allows pixels which do not meet this criterion to be passed over. This greatly reduces the number of pixels actually replaced within each frame and thus reduces the blurring effect of selective median filtering.

Selective median filtering can utilize an absolute threshold in digital counts or some equivalent metric for determining a replacement true/false decision when comparing a pixel value to its neighborhood mean or median. In some embodiments, the selective median filter can use a relative threshold such as percentage over or under the neighborhood mean or median, or it can more simply find those pixels which are the maximum or minimum among their neighborhoods and replace their values accordingly (this uses fewer operations but results in the most blurring out of these three example selective methods).

A threshold criterion can be based on the global array temporal noise statistics combined with the known lens PSF intensity distribution. If a pixel value is greater than or less than a neighborhood computed value by an amount predetermined or computed in real time (e.g. more than twice the average pixel temporal rms noise plus a fixed intensity offset) then that pixel value is replaced with the median. In some embodiments, a more intensive computation based on temporal noise statistics of each pixel can be used. Thus, in such embodiments, the threshold could be different for each pixel. The threshold may vary by amounts on the order of each pixel's rms noise.

Selective median filtering of method 400 may function over a range of oversampling, including down to quantum size detection elements such as quantum dots, jots, or nanopixelated image sensors.

Using the PSF, expected weights can be developed and the expected neighbor pixels' values may be calculated. If over a frame or a set of frames the values do not agree to thresholds based on projected PSF weighting, selective median can be performed. Thus, it can be determined when to utilize selective median filtering block 110 and/or method 400.

In some embodiments, one or more processors (e.g. processor(s) 150) executing computer instructions of a computer program product compare each pixel value to its local median filtered neighborhood (e.g. the kernel or another nearby region) in order to provide real-time performance on large infrared pixel arrays. In some embodiments, this is accomplished using available computing architecture(s) (e.g. CPU-based OpenCV to obtain the medians). In some embodiments, each pixel is compared directly against its N×N−1 neighbors (e.g. in a 3×3 kernel where N=3 or 5×5 kernel where N=5). The median value is used for replacement only if the pixel was above the maximum (e.g. median plus maximum threshold) or below the minimum (e.g. the median minus the minimum threshold). However, this is a more computationally intensive operation that may require parallel architecture (e.g. GPU-based or firmware-based) if it is to process large arrays in real time. All neighbors in the N×N kernel are desired to be defect-free in such embodiments.

In some embodiments, unfiltered, oversampled infrared image data is received as an input to selective median filtering 110 and/or method 400. The selection ranges may then be defined (e.g. the minimum and maximum thresholds). In some embodiments, the adjustment range is 50-500 counts within a 14-bit system. In some embodiments, the threshold may be as low as the average temporal root mean square (rms) noise or a multiple thereof. In some embodiments, the temporal rms noise is much less than the expected neighborhood intensity differences due to lens PSF. Thus, the rms noise is generally absorbed into the thresholds. The calculations are performed on arrays of image data. The median for each pixel may then be determined using a kernel, such as a 3×3 or 5×5 sub-array of pixels. The median is subtracted from the input data. The resultant exposes the deviations of the input data from the median. In some embodiments, the resultants are also ensured to be positive. The positive resultants are then compared to the threshold(s). If the positive resultants exceed the threshold(s), the corresponding pixels are tagged as bad. The output(s) for these pixel(s) are replaced by the corresponding median(s). Thus, the output data is the selective median filtered infrared image data.

In some embodiments, the threshold can be adjusted in real time. In such embodiments, a total number of replaced pixels across the array in every processed frame may be limited. This may be accomplished using an averaging window or similar mechanism to perform low pass filtering and smoothing out threshold adjustments over time so that the amount the threshold may be changed between frames is limited. In such embodiments, the number of frames for the moving low pass filter, comparison parameters, threshold limits and a target count may be initialized. For example, the target count might be initialized at one percent of the total number of pixels and may be user adjustable. The selective median filtering for the infrared image data may be performed in an analogous manner to that described above. Thus, infrared image data is received as an input. The calculations are performed on arrays of image data. The median for each pixel may then be determined using a kernel, such as a 3×3 or 5×5 sub-array of pixels. The median is subtracted from the input data. The resultant exposes the deviations of the input data from the median. In some embodiments, the resultants are also ensured to be positive. The positive resultants are then compared to the threshold(s). If the positive resultants exceed the threshold(s), the corresponding pixels are tagged as bad. The output(s) for these pixel(s) are replaced by the corresponding median(s). Thus, the output data is the selective median filtered infrared image data. In addition, after each processed frame, the threshold is adjusted to provide the desired total pixel replacement count over time.

FIG. 6 is a flow chart depicting an embodiment of method 600 for performing spatial-temporal filtering. Spatial-temporal filtering may be used to account for noise from the IR pixel array of an IR detection system, such as IR detection system 102. Spatial temporal filtering of method 600 is described for infrared pixels analogous to those described in the context of FIGS. 1A-1B and 2B. Although described in the context of a weighted average, method 600 may use another mean. Method 600 may be performed by using one or more processors to execute computer instructions on a non-transitory computer program product or medium (which may be stored on a memory or memories), such as processors 150, memory/memories 160 and/or spatial-temporal filtering 120 of IR imaging system 100. Further, in some embodiments, method 600 is performed for oversampled IR data. For example, method 600 may be used for IR imaging systems 100 having a pixel pitch not exceeding ten micrometers, and not exceeding five micrometers in some embodiments.

Referring to FIG. 6, method 600 starts after oversampled IR data has been received. A contrast is determined for a particular pixel and a set of nearby pixels for the particular pixel in the infrared pixel array, at 602. In some embodiments, the contrast is determined using a kernel for nine pixels (e.g. a 3×3 array of pixels). The pixel for which the contrast is determined is at the center. In some embodiments, the kernel is for an array including twenty-five pixels (e.g. a 5×5 array) with the pixel of interest at the center. Other kernels may be used. The contrast determined at 602 indicates the deviation of the surrounding pixels from the output of the pixel of interest. In some embodiments, prior to determining the contrast or as part of determining the contrast in 602, the oversampled data is smoothed. For example, a Gaussian may be used to smooth the data. In such embodiments, however, the data may be smoothed only for the purposes of determining the contrast. Thus, the oversampled IR data used for the weighted averaging and to be output as part of the image may not be smoothed. In other embodiments, no data is smoothed. In other embodiments, all data (both for contrast determination and for data being output for the image) are smoothed.

The weighted average for the pixel (i.e. the center of the array) is determined based on the contrast, at 604. Thus, 604 may include determining the weights and applying the weights to the pixel(s). In some embodiments, the weights are set based upon the contrast. For example, for high contrast systems (in which filtering may not be desired), the weight may be 1 for the pixel and 0 for nearby pixels. This ensures that the output for the pixel is not replaced. In contrast, for zero or very low contrast, the output of the pixel may be desired to be replaced by the outputs of its neighbors. In such embodiments, the weight for the pixel may be zero and the sum of the weights of the nearby pixels may be one. For a medium contrast region, weights that approximate a Gaussian may be used for the kernel. Thus, 604 may include determining the appropriate kernel for the pixel (i.e. calculating the weights for the surrounding pixels as described below). Thus, the weighted average may be computed for each pixel based on the contrast for the nearby pixels, at 604.

The output of the pixel is replaced by the weighted average based on the contrast, at 606. In some embodiments, it is determined whether the contrast is sufficiently high that the output of the pixel is not replaced. In some embodiments, the weights are determined in order to replace the output with the desired values (including a value equal to the output of the pixel for high contrast regions and a value equal to the weighted average of nearby pixels only for a very low contrast region). Thus, the output of a pixel may be selectively replaced, at 606. This process may be repeated for remaining pixels in a frame at 608, and for multiple frames in a video, at 610.

For example, suppose a kernel corresponding to nine pixels (i.e. a 3×3 array of pixels) is used. The contrast may be determined for a particular pixel (e.g. the center pixel) of the 3×3 array, at 602. In some embodiments, the Prewitt operators for the horizontal (e.g. x) direction and the vertical (e.g. y) direction are used. In such embodiments, the horizontal contrast may be determined by multiplying a 3×3 Prewitt horizontal (x) operator by the kernel including the outputs of the 3×3 array of pixels. The vertical contrast may be determined by multiplying a 3×3 Prewitt vertical (y) operator by the kernel including the outputs of the 3×3 array of pixels. The contrast may be given by the square root of the sum of the squares of the vertical and horizontal contrasts (i.e. contrast=sqrt(HorizontalContrast$^2$+VerticalContrast$^2$)). In some embodiments, the contrasts may be determined using the Sobel operator. In such embodiments, the Prewitt operations are given by:

$$Px = \begin{matrix} -1 & 0 & 1 \\ -1 & 0 & 1 \\ -1 & 0 & 1 \end{matrix}$$

$$Py = \begin{matrix} -1 & -1 & -1 \\ 0 & 0 & 0 \\ 1 & 1 & 1 \end{matrix}$$

The Sobel operators are given by:

$$Sx = \begin{matrix} -1 & 0 & 1 \\ -2 & 0 & 2 \\ -1 & 0 & 1 \end{matrix}$$

$$Sy = \begin{matrix} -1 & -2 & -1 \\ 0 & 0 & 0 \\ 1 & 2 & 1 \end{matrix}$$

The weighted average for the pixel (i.e. the center of the array) is determined based on the contrast, at 604. In some embodiments, the weights are set based upon the contrast. In some embodiments, thresholds may be set for the contrast calculated at 602. For example, suppose a value, a, is determined based on the contrast. For a contrast below a first threshold (very low contrast), a may be a first value (e.g. 0 for maximum averaging). For a contrast that is at least the first threshold and less than a second threshold, a is determined to be a second value (e.g. 0.128 as indicated below). For a contrast that is at least the second threshold and less than a third threshold, a may be a third value (e.g. 0.5-0.6 as indicated below). For a contrast that is at least the third threshold, a is determined to be a fourth value (e.g. 1 as indicated below). Fewer or more thresholds and values of a may be used in some embodiments. These values of a may be used to determine the weights. For example, if C denotes the center pixel of the array, O denotes the four pixels offset vertically only and horizontally only and D denotes the pixels offset diagonally/at the corners of the array, then the weights may be given by:

$C+4O+4D=1$ $O=(1-C)/(4*(1+1/\text{Sqrt}(2)))$ $D=O/\text{Sqrt}(2)$

For example, the kernel for an image may be given by:

$$f(a) = \begin{matrix} D & O & D \\ O & C & O \\ D & O & D \end{matrix}$$

In some such embodiments, a is set based on the contrast, and C=a. In some embodiments, a [0,1] such that a global offset is not altered. For example, the kernel for a very low contrast region (contrast below a first threshold) a=0. In such cases, the kernel may be given by:

$$f(a=0) = \begin{matrix} .104 & .146 & .104 \\ .146 & 0 & .146 \\ .104 & .146 & .104 \end{matrix}$$

For a low contrast region, a=0.128. In such cases, the kernel may be given by:

$$f(a=0.128) = \begin{matrix} .09 & .128 & .09 \\ .128 & .128 & .128 \\ .09 & .128 & .09 \end{matrix}$$

For a medium contrast region, a=0.5-0.6 (i.e. a Gaussian-like kernel). In such cases, the kernel may be given by:

$$f(a=0.5) = \begin{matrix} .053 & .07 & .053 \\ .073 & .5 & .073 \\ .053 & .07 & .053 \end{matrix}$$

For a high contrast region, a=1 (C=1, D=O=0). Thus, the weighted average may be computed for each pixel by multiplying the pixels by the kernel f(a), at 604.

The output of the pixel is replaced by the weighted average, at 606. Because of the manner in which the weighted average may be computed in some embodiments, the weighted average may simply be the output of the pixel (i.e. for high contrast), may be the weighted average of the outputs of nearby pixels only (i.e. for very low contrast), or may be an intermediate value (e.g. for low or moderate contrast). This process may be repeated for remaining pixels in a frame at 608, and for multiple frames in a video, at 610.

Thus, using method 600, spatial-temporal filtering may be performed. In some embodiments, selective median filtering (e.g. using method 400) is performed before spatial-temporal filtering using method 600. Thus, issues such as bad pixels may be accounted for using selective median filtering prior to spatial-temporal filtering. Spatial-temporal filtering using method 600 may allow for noise to be reduced without a significant loss of contrast. Thus, image quality may be improved.

Thus, selective median filtering and/or spatial-temporal filtering may be performed. Resolution enhancement may be desired to be performed in addition to or in lieu of selective median filtering and/or spatial-temporal filtering. FIGS. 7A-10D describe resolution enhancement that may be performed using an inverse filter. The resolution enhancement determines a PSF blur based on a PSF of a lens for the infrared detection system (e.g. infrared detection system 102) including the lens and the infrared pixel array. An inverse filter using the PSF blur is applied to the oversampled infrared data to provide filtered infrared data. The infrared image corresponding to the filtered infrared data is output. Performing the resolution enhancement may further include up-sampling the oversampled infrared data to provide the oversampled infrared data to which the filter is applied. For example, the oversampled infrared data may be upsampled by a factor of four prior to application of the inverse filter. To do so, the values for the upsampled "pixels" that are inserted are interpolated (e.g. using cubic, linear, or some other interpolation method) between the values at the edges (e.g. the first pixel and the fifth pixel when up-sampling by a factor of four). After application of the inverse filter and prior to compressing, outputting, or otherwise operating on the image, the data may be down-sampled. Thus, down-sampled, filtered infrared data is provided. The infrared image is based on the down-sampled, filtered infrared data. In some embodiments, however, down-sampling and/or up-sampling may be omitted.

The Wiener filter is a type of inverse filter used in signal and image processing and is a popular choice for mitigating the problem of noise amplification at higher frequencies arising from deconvolution with inverse filtering. The Wiener filter is expressed by $$F(u,v)=W(u,v)G(u,v)$$

and $$W(u,v)=H^*(u,v)/[|H(u,v)|^2+K(u,v)]$$

Where

W(u,v) is the Wiener filter in the spatial frequency domain
G(u,v) and F(u,v) are the 2D Fourier transforms of the input (degraded) and output (restored) images
H(u,v) is the 2D Fourier transform of the degradation model and * denotes the complex conjugate
K(u,v)=Sn(u,v)/Sf(u,v) is the ratio of power spectral densities of noise n(x,y) and signal f(x,y) and is often set to a constant which is determined empirically.

Wiener filtering is a common global image restoration technique that is normally applied to pixelated images that exhibit less than the theoretical maximum spatial frequencies due either to relative camera motion during exposure or to non-optimal lens focus during acquisition. Stated differently, Wiener filtering is used in processing image data to address blurring that is typically due to motion of the camera or poor focusing. The maximum spatial frequency resolvable by an imaging system is expressed in its MTF. Generally, to deblur an image, an assumption is made as to the extent of the global blurring by computing a two-dimensional model of the transfer function required to produce such a blurred output image given a non-blurred input, and this model, in addition to a signal-to-noise (SNR) estimate, is used to create a Wiener filter in the spatial frequency domain. Then a blurred frame is processed by taking its frequency representation, for example using a two-dimensional discrete Fourier transform (DFT), multiplying by the Wiener filter, then converting back to spatial representation using the inverse DFT.

Apart from the motion induced cases, a blurred image is usually due to optical defocus that rendered a point spread function (PSF) diameter, i.e., the diffraction-limited spot size, wider than the physical pixel size. This situation effectively makes an oversampled system out of a native undersampled system because the blur has low pass filtered all frequencies above some spatial limit that is less than the pixel array's Nyquist sampling limit. This reduces the MTF figure of merit.

Deblurring techniques, such as application of the Wiener filter, are generally deemed inappropriate for infrared images because infrared image data is typically undersampled. For example, for pixel arrays used in infrared imaging (e.g. for wavelengths on the order of 700 nanometers through 1 millimeter in some embodiments, and one micrometer through fifteen micrometers in some such embodiments), the pixel pitch is typically on the order of ten micrometers or more. However, the wavelengths of interest are often on the order of ten micrometers or less for such pixel arrays. As a result, the pixels are typically wider than the point spread function (PSF) for the lenses used with the pixels. Thus, as described above, the Wiener filter is not utilized for conventional IR imaging.

Figure 7A:
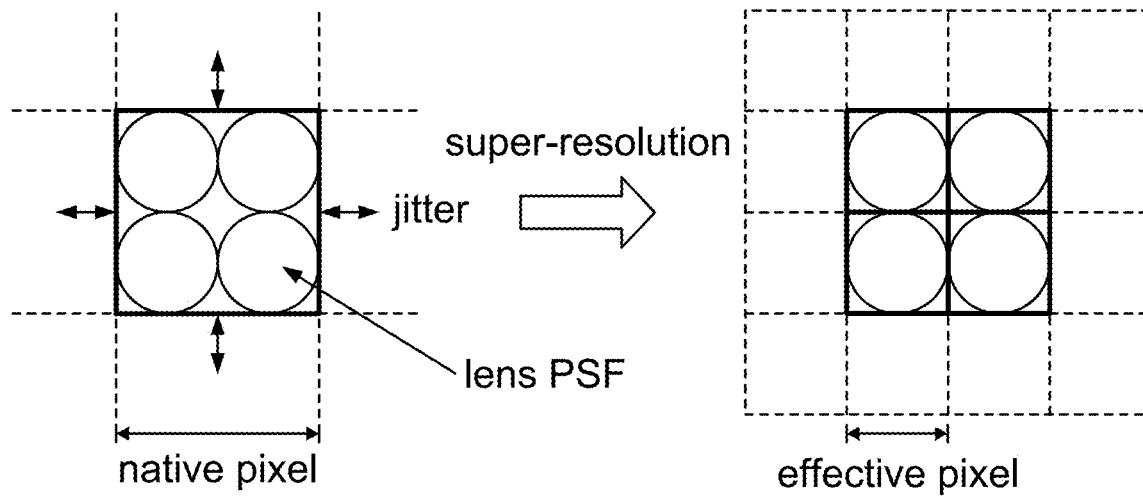
FIGS. 7A-7B illustrate the difference between deblurring techniques used for undersampled IR data and resolution enhancement used with oversampled IR data.

Much research has been applied to enhancing the resolution of images, including infrared images, that assumes spatially undersampled scene content due to oversized pixels within the sensor, i.e., relative to the object of interest focused onto the sensor plane. For the most part, the intent is to "pull out" additional information, e.g., spatial detail, by utilizing computationally costly and iterative techniques requiring multiple image frames of the same relative-static scene in order to achieve the desired result. Further, some techniques are actually dependent on the existence of sub-pixel jitter between frames. This may seem counter-intuitive because pixel jitter occurring at rates near or higher than the inverse of the exposure time generally leads to image blur to begin with. These enhancement techniques are termed "geometrical super-resolution" techniques. These techniques may be described as "fast" relative to other conventional methods but still fall short of processing at video rates, being targeted rather toward image restoration separate from the sensor system. For example, FIG. 7A illustrates "geometrical super-resolution", which may be carried out for infrared pixels. The circles indicate the range of the lens PSF (approximately half the width of the native pixel in this example). Utilizing the jitter, a sensor with higher native resolution can be mimicked by using an iterative process over many image exposures. Each image exposure (or frame) contains a measurable "centroid shift" around each pixel due to intentionally- or naturally-caused sub-pixel image jitter. Through iterative computations, the effective pixel width may be shrunk to provide geometrical super-resolution.

Application of a Wiener filter to a two-dimensional oversampled infrared image allows simple real-time resolution enhancement and improved digital zoom by taking advantage of local pixel correlation due to the known lens characteristics, without requiring scene motion or iterative techniques as is common with undersampled infrared images.

An oversampled image created by a high resolution, small pixel pitch, imaging system is utilized. Thus, the infrared image data is oversampled and may be analogous to the situation shown in FIG. 2B. The focus is assumed to be optimal (or at least sufficient) to begin with. Due to the nature of oversampling, it is known that the pixel size is already smaller than the PSF diameter of the lens' theoretical performance. A lens PSF is typically Gaussian in shape as indicated in FIGS. 2A-2B. This shape is exploited by simply treating the oversampled image as if it has been corrupted by the inherent "PSF blur", and applying the Wiener filter in the same manner as described herein. However, the lens' actual PSF is utilized for the two dimensional model of the modulation transfer function. The result is an image that has higher spatial resolution than what is attainable even with an optimally focused lens. Thus, the techniques effectively improve upon the theoretical MTF of the lens.

Figure 7B:
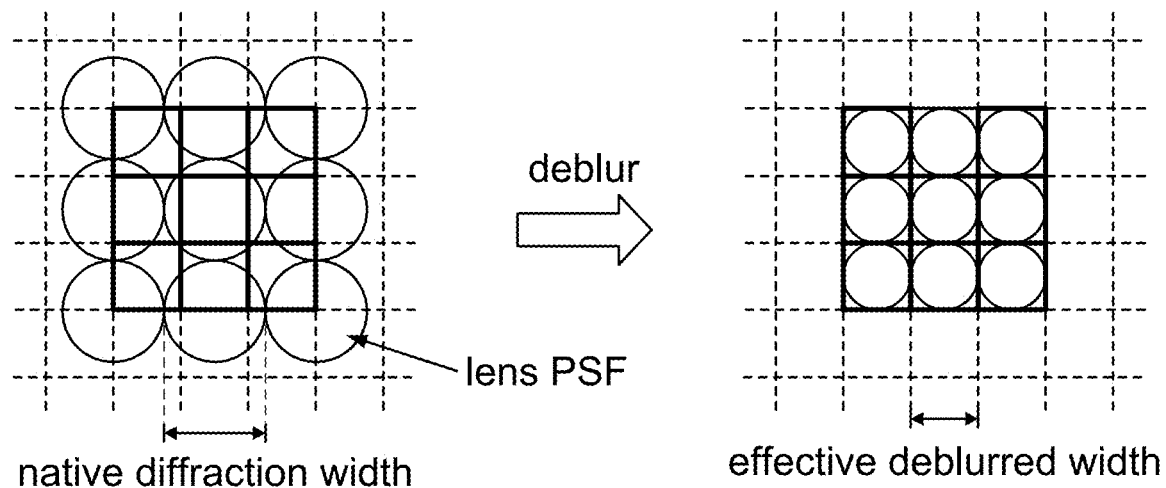

For example, FIG. 7B illustrates deblurring in this embodiment, which may mimic a lens with smaller diffraction-limited blur, i.e., PSF or "spot size," by applying the known spatial frequency characteristics of the lens to every frame's spatial frequency representation. In some embodiments, the efficacy of technique is improved by ensuring that the applied lens function is minimally bandlimited. Thus, hence input frame and PSF of the Wiener filter are up-sampled together first. For example, the input data and PSF may be up-sampled by a factor of 2, 3, 4, 5, 6, or another factor greater than one.

Figure 8:
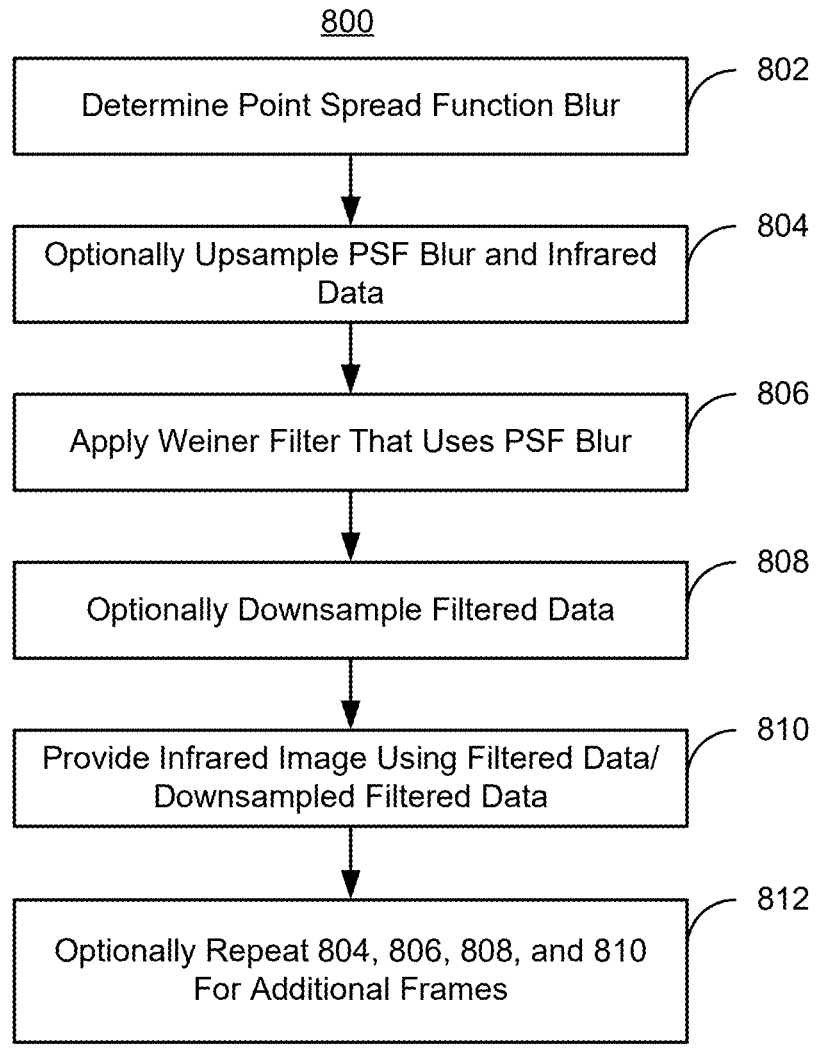
FIG. 8 is a flow chart depicting an embodiment of a method for performing resolution enhancement for oversampled IR data.

FIG. 8 depicts an embodiment of method 800 for performing filtering for oversampled IR data analogous to that described in the context of FIGS. 2B and 7B. Method 800 may be performed by using one or more processors (e.g. processor(s) 150) to execute computer instructions on a non-transitory computer program product or medium (which may be stored on a memory or memories such as memory/memories 160). Method 800 is utilized with oversampled infrared data captured using an infrared system having lens(es) and pixel array(s). In some embodiments, the infrared pixel array has a pitch less than ten micrometers. The pitch of the infrared pixel array may be less than five micrometers. The infrared data on which the method is utilized may be for an entire frame, multiple frames, a portion of the frame, and/or a portion of multiple frames. In some embodiments, method 800 is used for IR imaging system 100 (e.g. resolution enhancement 130)

A point spread function (PSF) blur is determined based on a PSF of a lens for an infrared detection system, at 802. The PSF blur and infrared data may be optionally up-sampled, at 804. In some embodiments, the determination of the PSF blur at 802 and the up-sampling of the PSF blur may be determined once for an infrared detection system. In some embodiments, the up-sampled PSF and infrared data pixel values may be interpolated using linear, cubic, or other method. An inverse filter, or deblurring filter, such as a Wiener filter, is applied to the (optionally up-sampled) infrared data, at 806. In some embodiments, 806 includes performing a direct Fourier transform, application of the filter and an inverse direct Fourier transform after application of the filter. The Wiener filter uses the (optionally up-sampled) PSF blur. If the infrared data and PSF blur were up-sampled, then the filtered infrared data might be down-sampled, at 808. In some embodiments, the filtered infrared data may not be down-sampled. An infrared image corresponding to the (optionally down-sampled) filtered infrared data is output, at 810. In some embodiments, outputting the image at 810 may include forwarding the filtered infrared data to the next portion of the system. For example, instead of directly outputting the data to a display at 810, the data may be compressed and/or otherwise processed. In some embodiments, at least a portion of the method is repeated for each frame of an infrared video. For example, 804 (if used), 806, 808 (if used) and 810 may be repeated for additional frames. The method may result in a reduction of blur, including blur due to the PSF of the detection system. Further, the up-sampling may improve spatial accuracy and resolution of the Wiener filtering operation and result. The result need not be down-sampled, which may provide a more effective digital zoom with improved quality, i.e., it will be less visually pixelated to an observer. In some embodiments, the result may be down-sampled (e.g. back to original size) while maintaining enhanced resolution compared to the input image.

This technique may also be applicable to blur-like effects due to electrical or optical crosstalk occurring in the sensor itself. In this case the overall effective PSF may be more uniform and less Gaussian in shape, such as that which results from a box filter kernel.

The technique allows for real-time adjustment of the PSF and SNR estimates, so that the user may fine-tune the result based on qualitative or quantitative metrics such as an edge sharpness or local contrast measure.

The particular embodiment described below uses an up-sampling of 4X (four times) in order to balance resolution against computational requirements of the interpolation step. Other up-sampling (including no up-sampling) may be used in other embodiments. In some embodiments, the software/process can be auto-tuning. For example, the optimal radius of the PSF blur and SNR (signal-to-noise) variable values may be determined by computing image quality metrics on a deblurred region of interest (ROI) and making real-time adjustments to the defaults. In some embodiments, the method, system and/or computer program product could perform the deblurring on only a specific ROI as an aid to a digital zoom application, or to decrease the computational requirements. This example achieved real-time performance on moderate size arrays using the computing architecture and image processing libraries available (e.g. CPU-based OpenCV with native functions and processing libraries). In other embodiments this code example can be programmed to run using a parallel architecture (GPU-based or firmware-based) if it is to process large arrays in real time.

In some embodiments, the default PSF blur and SNR are defined. In some embodiments, the adjustment range is 1-100 pixel widths and 0-100 ratio, respectively, for PSF and SNR. Other variables, such as the radius of the PSF blur and the SNR are defined. Other variables used may also be defined. Further, any arrays used in performing the filtering (to store initial, intermediate or final pixel values) may also be defined. The up-sampled PSF blur is determined. In some embodiments, the appropriate values are provided to the PSF blur array. The frequency transformed Wiener filter may also be determined (and thus the appropriate values stored in the corresponding array). The image data may also be up-sampled by the same amount as the PSF blur. In the spatial frequency domain, the Wiener filter may be applied to the (up-sampled) image data. The filtered (i.e. deblurred) result may then be down-sampled. If used for zoom, some or all of the filtered result may not be down-sampled. In some embodiments, the ROI for normalization and display is defined. In some embodiments, a PSF dependent border width is excluded from being part of the ROI. Thus, over-sampled infrared image data may be filtered to reduce blurring and enhance resolution.

Figure 9A:
FIGS. 9A-9E illustrating the image quality possible using resolution enhancement for oversampled IR data.
Figure 9B:
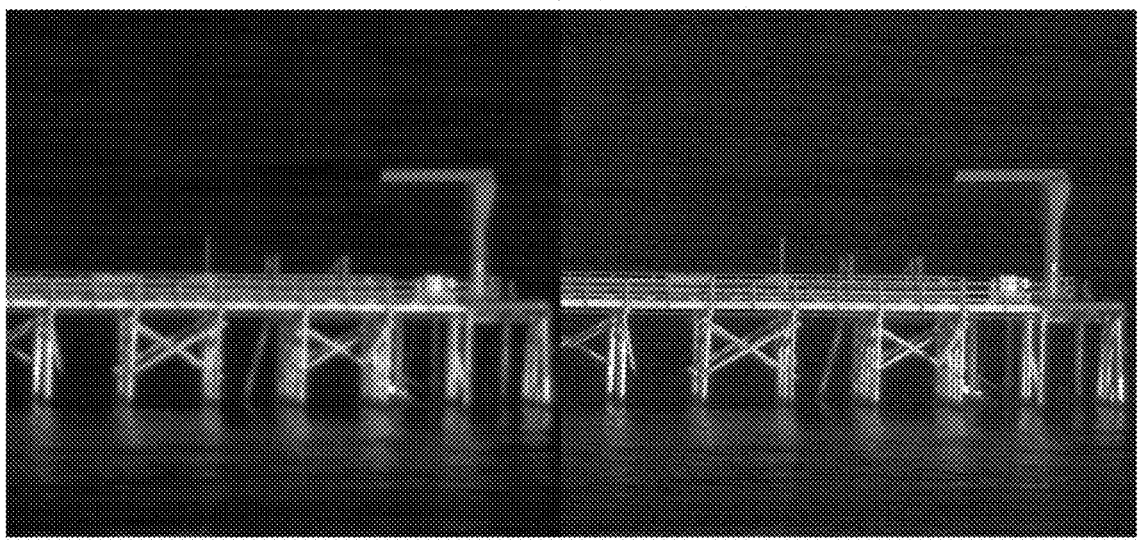
Figure 9C:
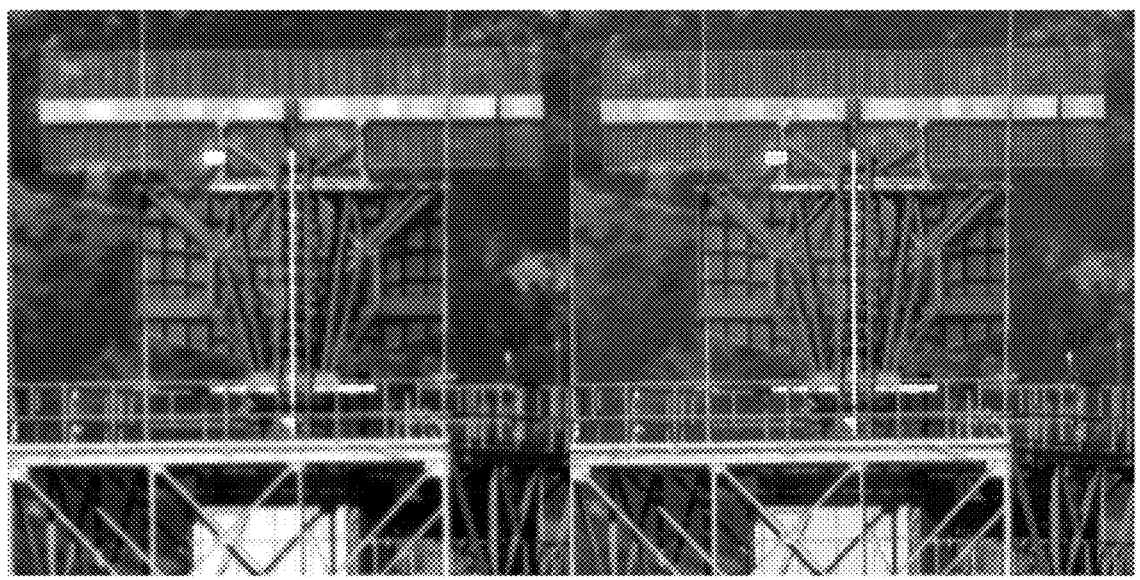

For example, FIGS. 9A-9C show results of deblurring (otherwise termed resolution enhancement) using embodiments of techniques described herein on oversampled infrared images. Input images are on the left, output images are on the right. Image pairs contain high spatial frequency content which gets visually sharper (e.g. having higher local contrast) following application of the technique.

Figure 9D:
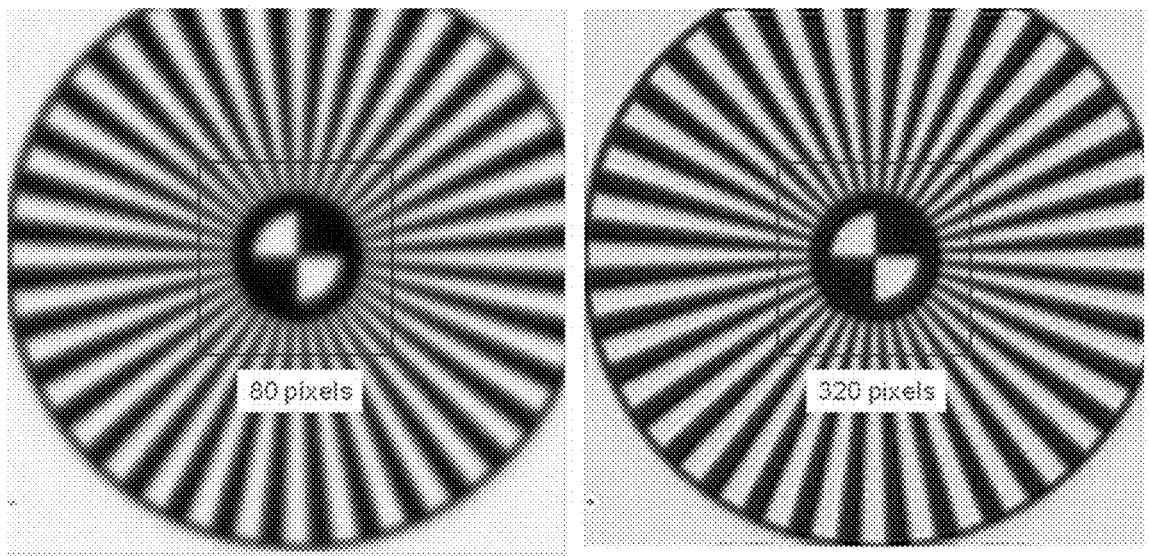
Figure 9E:
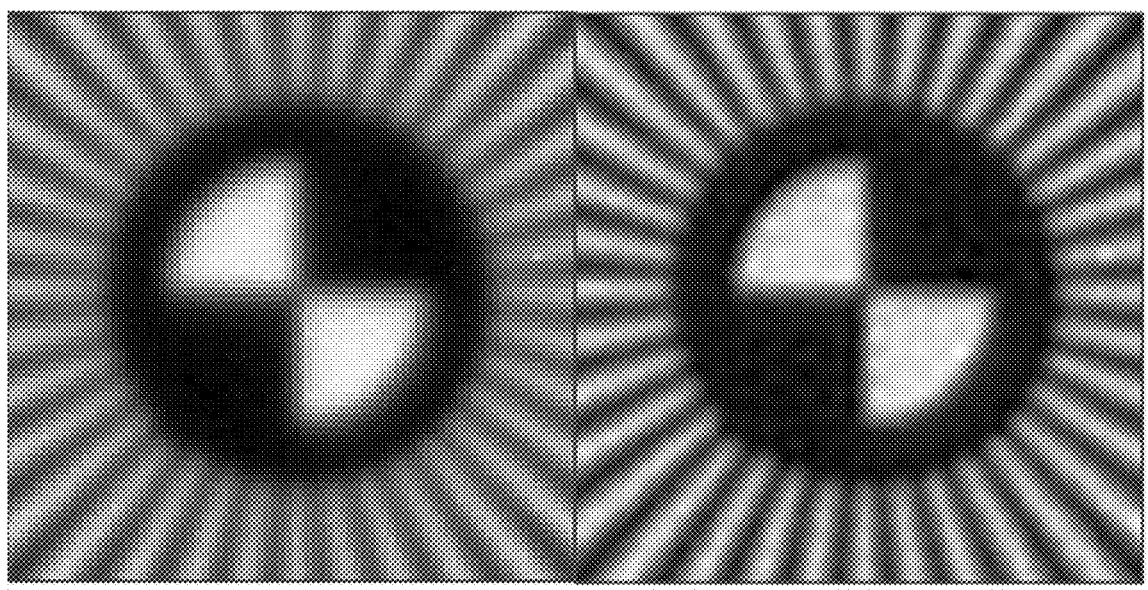

FIGS. 9D-9E shows results of deblurring with up-sampling using an embodiment of the techniques described herein on an infrared Siemens Star target. Input image is on the left, output image is on the right. Image pairs demonstrate the benefit of the up-sampling step, in this example 4× up-sampling was used. The region of pixels defined by the red box in FIG. 9D is enlarged in FIG. 9E. The resolution is effectively increased by 4× after application of the technique which allows digital zoom operations to provide sharper detail while not appearing visually pixelated as seen on the input image.

Figure 10A:
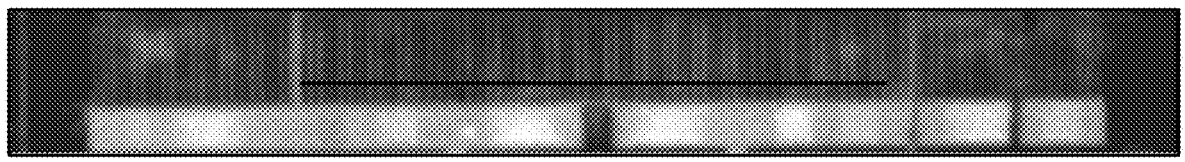
FIGS. 10A-10D indicate an analysis of an infrared image for which resolution enhancement is performed.
Figure 10B:
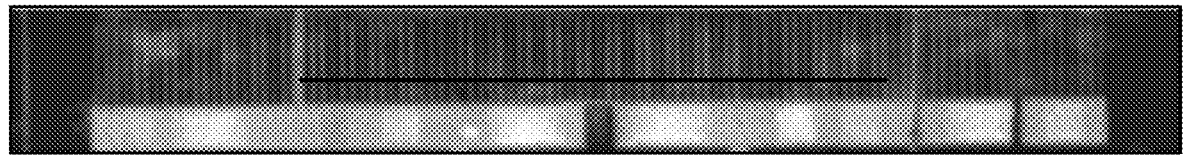
Figure 10C:
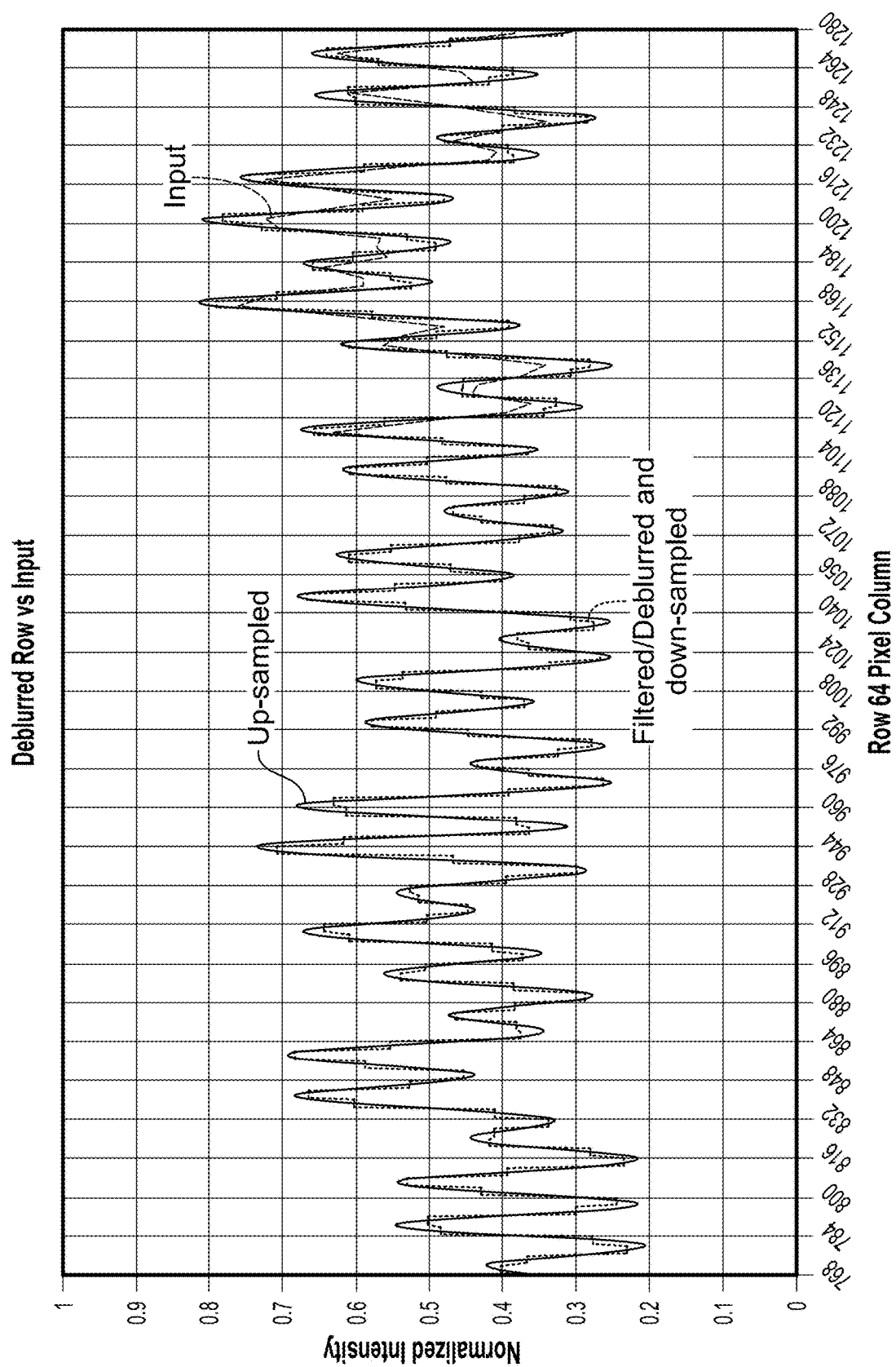
Figure 10D:
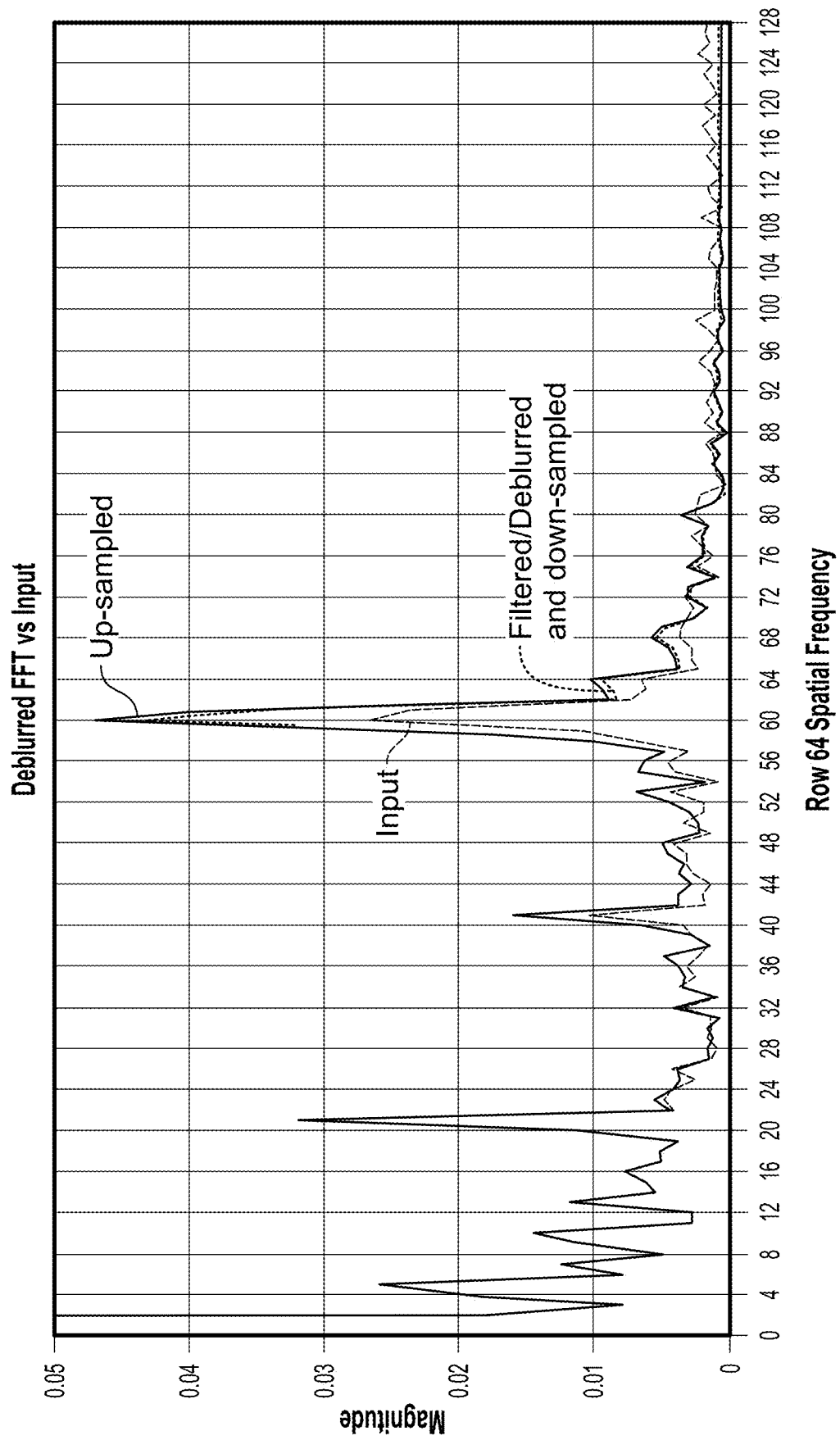

FIGS. 10A-10D indicate an analysis of the 64th row of an infrared image shown in a prior figure (e.g. FIG. 9C), a row possessing a large region of regular high frequency spatial content along the horizontal axis. The image region around the 64th row is shown along with plots of the pixel intensities and plots of the Fourier transforms along the row, before and after deblurring. FIG. 10A is the image corresponding to the input infrared data with the middle 256 pixels of 64th row used for the analysis marked with a red line. FIG. 10B is the image corresponding to the up-sampled deblurred output with the corresponding pixels marked with a red line. FIG. 10C plots the normalized pixel intensities for the input image, and the up-sampled and down-sampled deblurred output images, respectively. (Input image row and down-sampled output row are stretched by 4× to match the up-sampling factor for plotting purposes only.) The improved local contrast (maximum-to-minimum intensity difference around each horizontal spatial period) of the deblurred output image is apparent in the plot as well as in the images. Improved contrast is retained even after down-sampling back to original size of the input image, confirming that the MTF of the lens has been effectively increased. The FFT plot of FIG. 10D shows that the dominant spatial frequency of the 64th image row, i.e., centered near point 60 on the horizontal axis, increases in energy content after deblurring. The plots in FIG. 10D are the Fourier transforms of the input, up-sampled output and down-sampled output, respectively. In this example, the up-sampled output has over 75% more energy than the input at this dominant frequency, and the down-sampled output still has over 60% more energy.

Thus, selective median filtering, spatial-temporal filtering, and/or resolution enhancement can be used to process infrared image data and improve the quality of infrared images. Systems with which selective median filtering, spatial-temporal filtering, and/or resolution enhancement of IR image data might be used are described with respect to FIGS. 11A-13. Such systems include infrared pixel arrays used in capturing infrared image data (e.g. in wavelength range of 780 nm-1 mm).

Figure 11A:
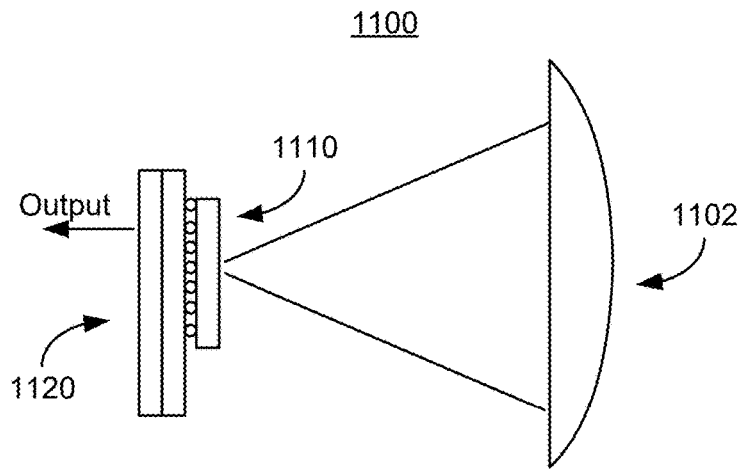
FIGS. 11A-11B depict an embodiment of an infrared detection system.
Figure 11B:
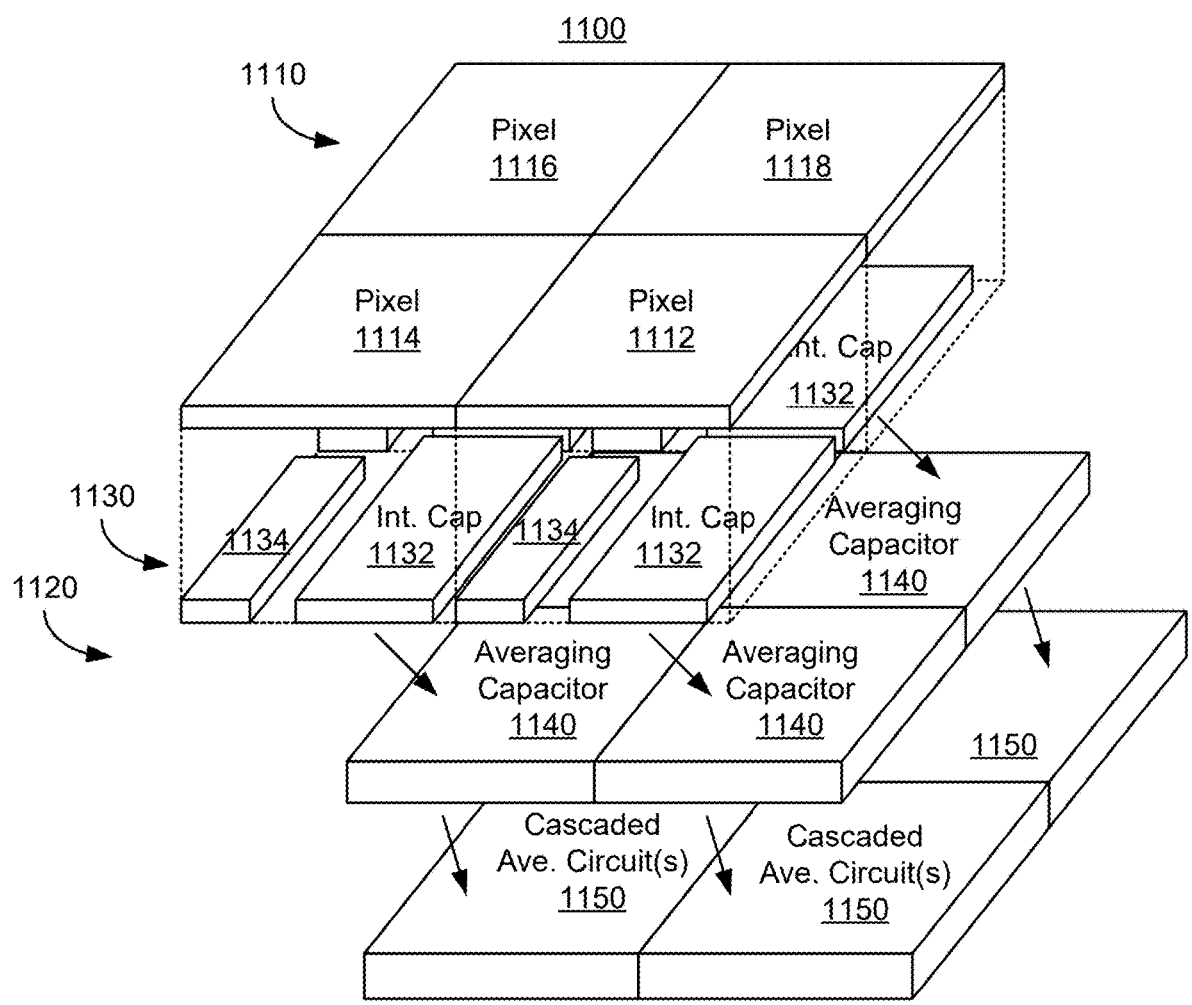

FIG. 11A is a side view of detection system 1100. FIG. 11B is an exploded view of a portion of detection system 1100. FIGS. 11A-11B are not to scale and only some components are shown. For example, FIG. 11B is intended to indicate relative areas and thus does not include various elements of detection system 1100. In some embodiments, detection system 1100 is an infrared radiation (IR) detection system. Thus, system 1100 is described in the context of infrared detection. However, in some embodiments, detection system 1100 might be used in connection with other wavelengths of light. IR detection system 1100 includes lens 1102, detector array 11110 that includes an array of pixels, and read out integrated circuit (ROIC) 1120. Lens 1102 focuses light down to a tightly focused spot. In some embodiments, lens 1102 focuses light to cover only a few pixels at a time. For example, the spot may impinge on 1, 2, 3, 4, 5 or 6 pixels of detector array 1110 at a particular time. In some embodiments, lens 1102 is configured to have an f-number equal or less than that required for Nyquist sampling with 5 micron pixels (e.g. typically less than 2). For example, lens 1102 may have an f-number greater than 0.8 and less than 1.5 for a midwave infrared band detector. In some embodiments, lens 1102 has an f-number that is nominally one. In other embodiments, lens 1102 may have a different f-number, including but not limited to 1.8-2.3 (e.g. nominally 2.0).

Detector 1110 is shown as a monolithic hybrid bumped interconnected detector. For example, detector 1110 may be a low band gap IR detector. In some embodiments, detector 1110 may be another type of detector. Detector 1110 includes an array of pixels, of which only four pixels 1112, 1114, 1116 and 1118 are shown in FIG. 11B. In some embodiments, pixels 1112, 1114, 1116 and 1118 are aligned with solder bumps (not shown in FIG. 11B) which provide connection to the underlying ROIC 1120. Pixels 1112, 1114, 1116 and 1118 may be considered to function as photodiodes. In some embodiments, pixels 1112, 1114, 1116 and 1118 have the same size. In some embodiments, pixels 1112, 1114, 1116 and 1118 are substantially square. In other embodiments, pixels 1112, 1114, 1116 and 1118 may have different sizes and/or other shapes. Pixels 1112, 1114, 1116 and 1118 are desired to be small. For example, detector 1110 may have a pixel pitch of less than ten micrometers (e.g. pixels 1112, 1114, 1116 and 1118 being smaller than 10 μm×10 μm). In some embodiments, pixels 1112, 1114, 1116 and 1118 may have a pitch of not more than eight micrometers ((e.g. pixels 1112, 1114, 1116 and 1118 being smaller than 8 μm×8 μm). In some embodiments, detector 1110 may have a pixel pitch of not more than six micrometers. For example, pixels 1112, 1114, 1116 and 1118 may have a pitch of five micrometers or less (e.g. pixels 1112, 1114, 1116 and 1118 being 5 μm×5 μm or smaller). In some embodiments, detector 1110 may have a pixel pitch of not more than three micrometers. Thus, pixels 1112, 1114, 1116 and 1118 are small in size. The number of pixels in the array of detector 1110 may be large. For example, a 1080×1920 array of pixels may be used in detector 1110. Other numbers, aspect ratios, numbers or pixels and/or other geometries are possible. The pixels in the array of detector 1110 may be read out and processed in a raster scan.

ROIC circuit 1120 includes fast integration and readout circuits 1130 utilized in providing a faster readout and may include cascaded averaging circuits 1150. Each fast readout circuit 1130 includes integration capacitor 1132, additional component(s) 1134, averaging capacitor 1140 and may include other elements. For example, switches and other elements are not shown. For example, a switch coupled between capacitors 1132 and 1140 may be used in periodically providing the signal on integration capacitor 1132 to averaging capacitor 1140. Additional component(s) 1134 may include a transistor coupled adjacent to the corresponding pixel 1112, 1114, 1116 or 1118 and integration capacitor 1132.

Integration capacitor 1132 and additional component(s) 1134 are laid out in a manner that may be constrained by the area of pixels 1112, 1114, 1116 and 1118. For example, integration capacitor 1132 and additional component(s) 1134 may be aligned with (e.g. under in an integrated circuit) the corresponding pixel 1112, 1114, 1116 and/or 1118. In some embodiments, components 1132 and 1134 may be in or near the corresponding pixels 1112, 1114, 1116 or 1118. Thus, components 1132 and 1134 may not consume more area than the corresponding pixel 1112, 1114, 1116 and/or 1118. Averaging capacitor 1140 of readout circuit 1130 and cascaded averaging circuits 1150 may be laid out in another manner such that the sizes of averaging capacitor 1140 and cascaded averaging circuits 1150 are not constrained by the areas of pixels 1112, 1114, 1116 and 1118 in the same way as for elements 1132 and 1134. For example, averaging capacitor 1140 and/or cascaded averaging circuits 1150 may be under the first layer of circuitry of ROIC 1120 (e.g. under integration capacitor 1132 and other components 1134) or adjacent to regions containing integration capacitor 1132 and other components 1134.

As indicated in FIG. 11B, integration capacitor 1132 has an area less than the available area corresponding to pixel 1112, 1114, 1116 and/or 1118. Additional components 1134 (if any) may occupy a particular portion of the area corresponding to pixels 1112, 1114, 1116 and/or 1118. The remaining area corresponding to pixels 1112, 1114, 1116 and/or 1118 is the available area. For example, suppose pixels 1112, 1114, 1116 and 1118 have a five micrometer pitch (e.g. are 5 μm×5 μm). If no other components are present, the available area is twenty-five square micrometers. In such a case, integration capacitor 1132 occupies an area that is less than twenty-five square micrometers. In some embodiments, additional components 1134 may include a transistor and/or additional components. Such a transistor might utilize ten square micrometers. For the five micrometer pitch example above, the available area is fifteen square micrometers (twenty-five square micrometers per pixel minus ten micrometers for the transistor). Integration capacitor 1132 thus occupies less than fifteen square micrometers in such cases. In some embodiments, integration capacitor 1132 occupies less than one-half of the available area. In some such embodiments, integration capacitor 1132 occupies not more than one-third of the available area. For example, integration capacitor 1132 might consume not more than one-fourth of the available area. As a result, integration capacitor 1132 has a capacitance, or well capacity, that is less than is allowed by the available area. In the five micrometer pitch/transistor 1134 example above, the available area for integration capacitor 1132 is fifteen square micrometers. This available area corresponds to a capacitance of approximately forty-five femto-Farads. Thus, integration capacitor 1132 has a capacitance of less than forty-five femto-Farads in this case. In some embodiments, integration capacitor 1132 has a capacitance of not more than half of the maximum capacitance for the available area (e.g. not more than twenty femto-Farads for a five micrometer pitch). In some such embodiments, integration capacitor 1132 has a capacitance of not more than one-third of the maximum capacitance for the available area (e.g. not more than fifteen femto-Farads for a five micrometer pitch). In some such embodiments, integration capacitor 1132 has a capacitance of not more than one quarter of the maximum capacitance for the available area (e.g. not more than twelve femto-Farads for a five micrometer pitch). In some embodiments, the capacitance of integration capacitor 1132 is less than ten femto-Farads and at least one femto-Farad. For example, integration capacitor 1132 might have a capacitance of 6-7 femto-Farads. Other capacitances are possible in other embodiments, for example based upon the dielectric constant of the insulator used in the capacitor and the area of the capacitor. Integration capacitor 1132 may have an integration time of not more than 1000 microseconds. In some embodiments, the integration time is not more than 500 microseconds. The integration time may be not more than 200 microseconds. For example, the integration time is as low as 100 microseconds or less. Other integration times are possible. Thus, integration capacitor 1132 may consume a smaller area, have a lower capacitance, a shorter integration time and a significantly higher gain.

In some embodiments, ROIC 1120 may be a three-dimensional ROIC. In such embodiments, ROIC 1120 may have multiple layers. In such embodiments, elements of ROIC 1120 may be vertically stacked and interconnected with vias (not shown). In such embodiments, integration capacitor 1132 may have a larger area based on the number of layers of the three-dimensional ROIC. However, the area per layer of such an integration capacitor may still be limited by the size of the corresponding pixel in an analogous manner. Thus, the capacitance of integration capacitor 1132 may be limited by the area of the corresponding pixel 1112, 1114, 1116 and/or 1118. For a single layer ROIC, this limitation may correspond directly to the area of the pixel. For a three-dimensional ROIC, the pixel area still corresponds to a maximum capacitance of integration capacitor 1132. However, maximum capacitance in such a case may be different (e.g. larger than for a single layer ROIC). Thus, integration capacitor 1132 may have an integration capacitance less than the maximum capacitance.

Averaging capacitor 1140 is coupled with integration capacitor 1132, for example through a switch (not shown). Averaging capacitor 1140 periodically receives input from integration capacitor 1132. For example, a signal may be provided from integration capacitor 1132 to averaging capacitor 1140 in response to the expiration of a time interval equal to the integration time. This may be accomplished by the periodic closing of the switch. Averaging capacitor 1140 has a greater capacitance, and thus well size, than integration capacitor 1132. In some embodiments, averaging capacitor 1140 has a capacitance that is at least twice and not more than twenty multiplied by the capacitance of integration capacitor 1132. Other capacitances are possible. Consequently, the charge on integration capacitor 1132 can be periodically provided to averaging capacitor 1140 in time intervals substantially equal to the integration time. For lower integration times, more samplings of integration capacitor 1132 may be provided to averaging capacitor 1140 to improve signal-to-noise ratios.

Averaging capacitor 1140 can provide an averaged signal after multiple samplings of integration capacitor 1132. Thus, averaging capacitor 1140 may be used to reduce noise in a signal provided from integration capacitor 1132. Averaging capacitor 1140 may still be sampled frequently to provide a fast readout. For example, a frame rate generally refers to sensor frame rate. Faster frame rates, which may meet or exceed 500 frames per second. In some embodiments, fast frame rates are at least 1000 frames per second. Such fast frame rate may be used for high maneuvering threats, jitter and smear reduction on moving platforms, and reduction of atmospheric effects. In some embodiments, framing that is above 1000 frames per second may be called "fast framing". In other embodiments, framing that is above 500 frames per second might be termed fast framing. The fast readout from averaging capacitor 1140 is consistent with fast framing in some embodiments. In some embodiments, integration capacitor 1132 can be joined though a switch (not-shown) to capacitor 1140 and only integrated for one integration cycle on the co-joined capacitors. This co-joined capacitor mode also enables very fast framing. In some embodiments greater than 1000 frames per second may be achieved.

IR detection system 1100 may also include one or more cascaded averaging circuits 1150 coupled to a corresponding fast readout circuit 1130. Cascaded averaging circuit(s) 1150 provide additional averaging to the signal from detector 1110. More specifically, cascaded averaging circuit(s) 1150 are coupled to a corresponding averaging capacitor 1140. In some embodiments, each cascaded averaging circuit 1150 includes at least one pair of capacitors arranged in a manner analogous to integration capacitor 1132 and averaging capacitor 1140. Thus, each cascaded averaging circuit 1150 may include an additional integration capacitor (not explicitly shown in FIGS. 11A-11B), an additional averaging capacitor (not explicitly shown in FIGS. 11A-11B) coupled with the additional integration capacitor and a switch coupled between the additional integration capacitor and the additional averaging capacitor. The additional averaging capacitor in the cascaded averaging circuit has an additional averaging capacitance greater than the additional integration capacitance of the additional integration capacitor in the cascaded averaging circuit. In some aspects, cascaded averaging circuit(s) 1150 are coupled to the averaging capacitor through a transistor and/or an amplifier. In other embodiments, an amplifier between cascaded averaging circuit and the averaging capacitor may be omitted. Operation of IR detection system 1100 is analogous to operation of IR detection system 1200, described below.

IR detection system 1100 may have improved performance. Detector 1110 may include smaller pixels (e.g. less than ten micrometers and five micrometers or less in some embodiments). Consequently, benefits such as improved resolution and reduced noise equivalent power (NEP) may be achieved. Further, IR detection system 1100 may address issues resulting from use of smaller pixels 1112, 1114, 1116 and 1118. A low f-number lens 1102 may be used. Using a low f-number (e.g. less than 2 and nominally 1 in some embodiments) for lens 1102 in conjunction with a high gain integration capacitor 1132, averaging capacitor 1140 and cascaded averaging circuit(s) 1150, the low etendue, or light collection efficiency, of small pixels 1112, 1114, 1116 and 1118 can be mitigated. ROIC 1120 may have circuit components allowing for increased gain for small pixels 1112, 1114, 1116 and 1118 while using successive signal averaging stages, such as averaging capacitor 1140 and cascaded averaging circuits 1150. Use of successive/cascaded averaging stages can reduce noise and hence improve noise equivalent power, signal to noise, and detectivity.

The high gain and low integration time (and smaller capacitance) of integration capacitor 1132 may also aid performing fast framing. In some embodiments, frame rates up to and exceeding 1000 frames per second may be supported. Similarly, low integration times, such as two hundred microseconds or less, may be utilized. Thus, multiple closely spaced fast moving events may be imaged on nanosecond or microsecond time scales at long ranges. The data from integration capacitor 1132 can be averaged using averaging capacitor 1140 so that a dim signal can be detected. Cascaded averaging circuit(s) 1150 effectively provides longer integration times and improves dynamic range, signal to noise, and contrast to noise ratio. Each stage of the cascaded averaging circuit 1150 reduces noise further and allows a longer time of integration for small pixels so that the signal to noise of smaller pixel may be equal or better than that of larger pixels. The high gain/low integration time of capacitors 1132 and 1140 in combination with the high effective well capacity of cascaded averaging circuit(s) 1150 allows for fast framing, low noise and high well capacity with a design and layout conducive to a small pixel format. Thus, IR detection system 1100 may reduce integration times, improve signal-to-noise, increase sensitivity, improve contrast, increase dynamic range, provide higher frame rates and improve imaging using smaller pixels 1112, 1114, 1116 and 1118. As a result, target detection, bullet trace back, detection of ultrasonic and hypersonic targets, detection of dim targets, improved resolution of distant targets and other applications may be facilitated.

FIGS. 12A-12D depict another embodiment of detection system 1200. For clarity, only some components are shown.

Figure 12A:
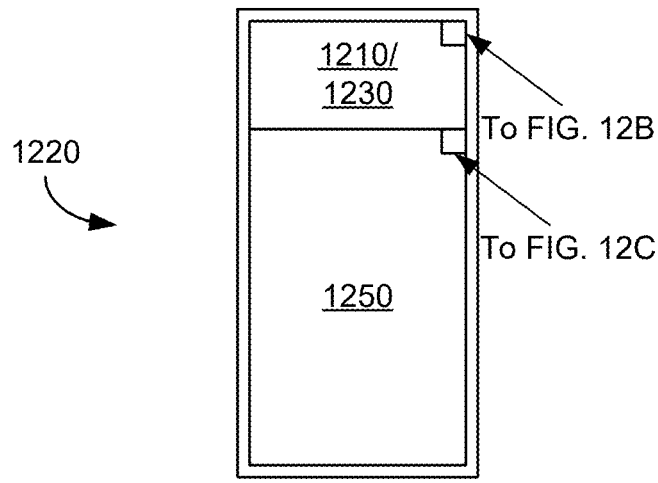
FIGS. 12A-12D depict another embodiment of an infrared detection system.
Figure 12B:
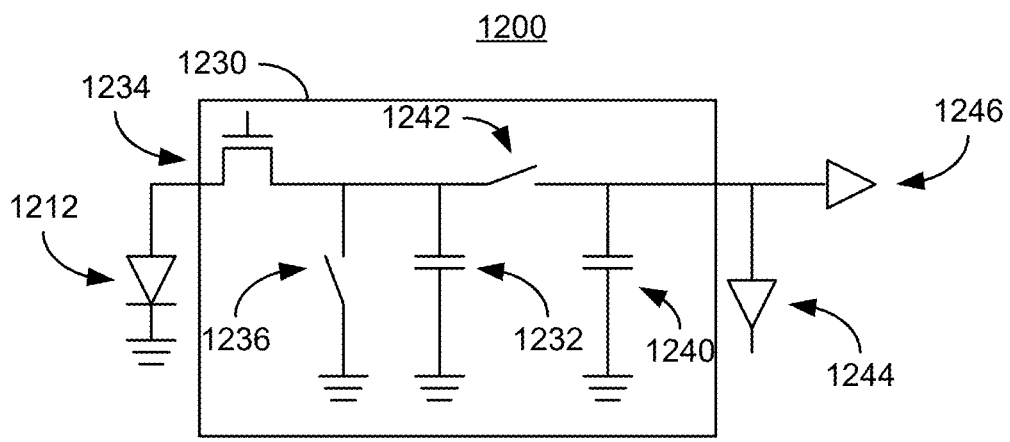
Figure 12C:
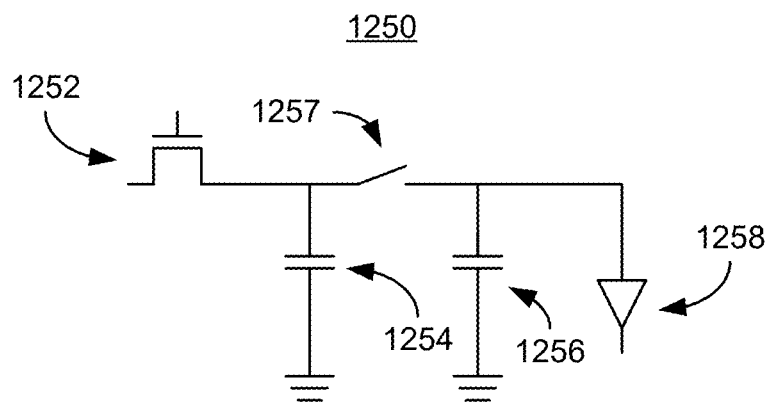
Figure 12D:
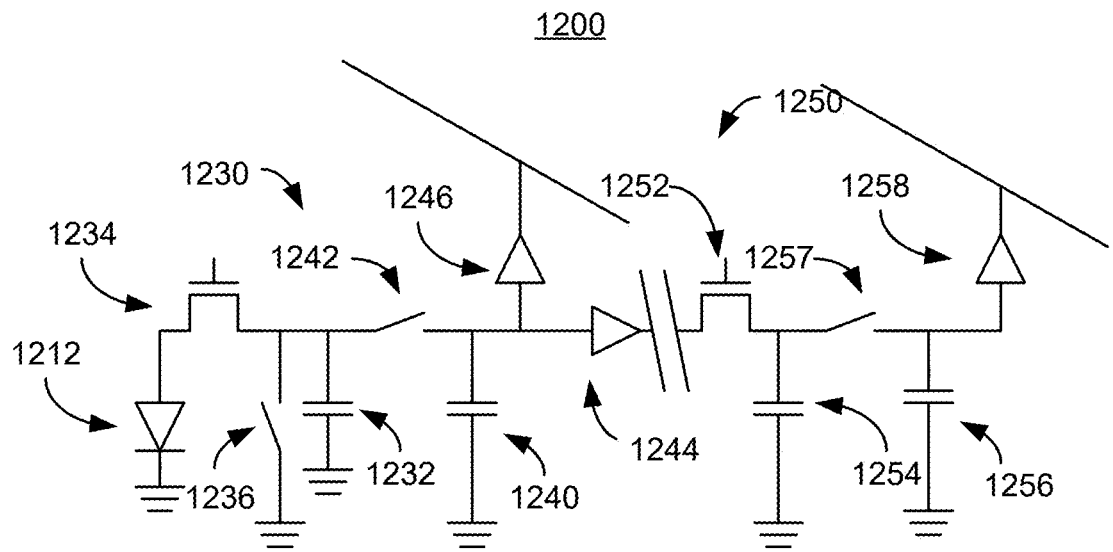

In some embodiments, detection system 1200 is an IR detection system. System 1200 is, therefore, described in the context of infrared detection. IR detection system 1200 includes detector 1210 and ROIC 1220. Detector 1210 includes an array of pixels and is analogous to detector 1110. ROIC 1220 that is analogous to ROIC 1120. A lens is not shown. However, a lens analogous to lens 1102 may be used in connection with IR detection system 1200. ROIC 1220 includes fast readout circuitry 1230 and cascaded averaging circuit(s) 1250 that are analogous to readout circuitry 1130 and cascaded averaging circuit(s) 1150, respectively. FIG. 12A depicts an embodiment of the breakout of components 1210, 1220, 1230 and 1250 and is not to scale. FIGS. 12B-12C depict circuit diagrams corresponding to portion of ROIC 1220. FIG. 12D depicts an embodiment of connections for components 1210, 1220, 1230 and 1250. As indicated by FIG. 12A, readout circuitry 1230 may be aligned with (e.g. fabricated under) detector 1210. Detector 1210 includes an array of pixels analogous to detector 1110. Thus, the sizes of the pixels in detector 1210 and areas of components in readout circuit 1230 are analogous to those described above with respect to detector 1110 and readout circuit 1110. In the embodiment shown, cascaded averaging circuit(s) 1250 reside to the side of the detector 1210 and readout circuits 1230. In other embodiments the cascaded averaging circuit(s) 1250 may reside underneath another layer, such as the layer including readout circuits 1230. Switch 1236 can be used as a reset to capacitor 1232 and/or capacitor 1240.

FIGS. 12B-12C are circuit diagrams depicting portions of IR detection system 1200. FIG. 11B depicts pixel 1212 of detector 1210, readout circuit 1230 and amplifiers 1244 and 1246. Pixel 1212 is a photodiode and analogous to one of pixels 1112, 1114, 1115 and 1118. Thus, pixel 1212 may be small, for example less than ten micrometers on a side. In some embodiments, pixel 1212 may be not more than five micrometers on a side. Readout circuit 1230 includes integration capacitor 1232 and transistor 1234 that are analogous to integration capacitor 1132 and component(s) 1134. Thus, integration capacitor 1232 may occupy less than the available area corresponding to detector 1212 and transistor 1234. Integration capacitor 1232 may also have a smaller capacitance. In some embodiments, integration capacitor 1232 has a capacitance that is not more than twenty femto-Farads. Integration capacitor 1232 may have a capacitance that is less than fifteen femto-Farads. In some embodiments, integration capacitor 1232 has a capacitance of at least one femto-Farad and not more than ten femto-Farads. In some embodiments, integration capacitor 1232 may have another capacitance. Although not shown in FIG. 12B, transistor 1234 may be biased during operation of IR detection system 1200. For example, slightly reverse biasing pixel/detector 1212 may provide a field such that when the photon hits the detector, the electron-hole pair is provided.

Readout circuit 1230 also includes averaging capacitor 1240 and switches 1236 and 1242. Averaging capacitor 1240 has a capacitance that is generally greater than the capacitance of integration capacitor 1232. For example, averaging capacitor 1240 may have a capacitance that is at least twice and not more than eighty multiplied by the capacitance of integration capacitor 1232. In some such embodiments, averaging capacitor 1240 has a capacitance that it not more than twenty multiplied by the capacitance of integrating capacitor 1232. In some embodiments, one of the amplifiers, such as amplifier 1246, may be used to provide an output from averaging capacitor 1240. The other amplifier, such as amplifier 1244, may provide a connection to cascaded averaging circuit(s) 1250.

An embodiment of cascaded averaging circuit(s) 1250 are depicted in FIG. 12C. In the embodiment shown in FIG. 12C, a single stage, or a single cascaded averaging circuit 1250 is used. In other embodiments, multiple cascaded averaging circuits (e.g. multiple stages) may be utilized. Cascaded averaging circuit 1250 is analogous to cascaded averaging circuit 1150. Cascaded averaging circuit 1250 is coupled with averaging capacitor 1240 via transistor 1252 and amplifier, such as amplifier 1244. In some embodiments, cascaded averaging circuit(s) 1250 is located to the side of the pixel array of detector 1210 and connected via a multiplexer (not shown). In some embodiments, cascaded averaging circuit 1250 is connected in a three-dimensional stack below the circuitry depicted in FIG. 12B. Other configurations are possible. In some embodiments, the high capacitor density and small design rules may allow for more components in small pixel imager array. Cascaded averaging circuit 1250 may be located nearby to pixel 1212 and associated circuitry depicted in FIG. 12B. Cascaded averaging circuit 1250 includes an additional integration capacitor 1254, additional averaging capacitor 1256, transistor 1252, switch 1257 and amplifier 1258. Signals input to cascaded averaging circuit 1250 via transistor 1252 are integrated onto integration capacitor 1254. After the expiration of a particular time interval, which may be larger than the integration time, switch 1257 is closed and the charge on additional integration capacitor 1254 is provided to additional averaging capacitor 1256. This process may be repeated multiple times. Consequently, additional averaging capacitor 1256 provides averaging of the signals integrated on additional subframe integration capacitor 1254. The averaged signal may be output via amplifier 1258.

FIG. 12D depicts an embodiment of IR detection system 1200 including pixel 1212, readout circuit 1230, cascaded averaging circuit 1250 and associated components. FIG. 12D thus includes a particular arrangement of pixel 1212/detector, readout circuit 1230, averaging circuit 1250, amplifiers 1244, 1246 and 1248 and switches 1242 and 1257 of FIGS. 12A-12C. In the embodiment shown, readout circuit 1230 includes two capacitors 1232 and 1240 and cascaded averaging circuit 1250 includes two capacitors 1254 and 1256. Integrating capacitor 1232, averaging capacitor 1240 and switch 1242 form a high gain input circuit in which current from the photodiode/pixel 1212 flows through the bias controlling direct injection gate 1234. Integrating capacitor 1232 forms a high transimpedance gain circuit whereby the signal and other front end noise sources can undergo a significant gain to allow fast well filling and fast frame rates. However, the noise on the integrating capacitor 1232 also undergoes gain. Averaging capacitor 1240 provides some noise reduction. Cascaded averaging circuit 1250 allows the high transimpedance with short integration times, but also provides for successively averaging the signal and noise from pixel 1212 and the remainder of IR detection system 1200. Thus, the lower photon flux signal for smaller pixel 1212 is not dominated by the noise after cascaded signal averaging.

Readout circuit 1230 provides integration of the signal from pixel 1212. Readout circuit 1230 also allows imaging of targets moving more quickly due to the short integration time for integration capacitor 1232. More specifically, signals from pixel 1212 are integrated on integration capacitor 1232 during an integration time. The integration time may be in the ranges described above. For example, the integration time may be two hundred microseconds or less in some embodiments. In addition to allowing for a short integration time for integration capacitor 1232, capacitor 1240 allows for averaging of the signal provided from pixel 1212. More specifically, after the expiration of the integration time, the charge on integration capacitor 1232 is provided to averaging capacitor 1240. This may be achieved by closing switch 1242. This procedure may be carried out for multiple cycles, with each cycle corresponding to an integration time. Thus, averaging capacitor 1240 may provide averaging of the signal from integration capacitor 1232. In some embodiments, readout circuit 1230 may reduce the noise on the signal from integration capacitor 1232 by a factor of approximately two through five. Thus, a fast readout, for example that may be suitable for fast framing described above, may be provided while allowing for some noise reduction by averaging capacitor 1240. A readout may be performed via amplifier 1246, while amplifier 1244 provides signals to cascaded averaging circuit 1250.

Cascaded averaging circuit 1250 provides additional averaging. Thus, averaging is cascaded through two sets of capacitors (1232/1240 and 1254/1256) if cascaded averaging circuit 1250 is used. Cascaded averaging circuit 1250 includes additional integration capacitor 1254, additional averaging capacitor 1256 and switch 1257. The capacitance of averaging capacitor 1256 is greater than the capacitance of integration capacitor 1254. In some embodiments, the capacitance of averaging capacitor 1256 is at least two and not more than twenty multiplied by the capacitance of integration capacitor 1254.

Cascaded averaging circuit 1250 reduces the noise over the signal provided by averaging capacitor 1240. Cascaded averaging circuit 1250 functions in a manner analogous to readout circuit 1230. More specifically, after the expiration of a particular time or a particular number of integrations of integration capacitor 1232, the charge on averaging capacitor 1240 is provided to additional integration capacitor 1254. This process is repeated a number of times. The charge on additional integration capacitor 1254 is shared via the switch 1257 with additional averaging capacitor 1256. This may be achieved by closing switch 1257. This procedure may be carried out for multiple cycles. Thus, additional averaging capacitor 1256 may provide averaging of the signal from additional integration capacitor 1254. For example, cascaded averaging circuit 1250 may reduce the noise on the averaging capacitor 1240 by about a factor of at least two and not more than five in some embodiments. In some embodiments, the sum of the capacitances of integration capacitor 1232 and averaging capacitor 1240 is greater than two femto-Farads. In some embodiments, the sum of the capacitances of integration capacitor 1232 and averaging capacitor 1240 is greater than ten femto-Farads. Similarly, in some embodiments, the sum of the capacitances of additional integration capacitor 1254 and additional averaging capacitor 1256 is greater than two femto-Farads. In some embodiments, the sum of the capacitances of additional integration capacitor 1254 and additional averaging capacitor 1256 is greater than ten femto-Farads. For example, capacitor 1254 may be at least one femto-Farad and not more than ten femto-Farads in some embodiments. In some embodiments, capacitor 1256 may have a capacitance of at least two femto-Farads and not more than fifty femto-Farads. In some embodiments, amplifier 1244 and capacitor 1254 may be omitted, for example if there is low enough interconnection capacitance from capacitor 1240 to capacitor 1256.

Capacitors 1232 and 1240 and transistor 1234 of readout circuit 1230 function in an analogous manner to capacitors 1254 and 1256 and transistor 1252 of cascaded averaging circuit 1250. Readout circuit 1230 and cascaded averaging circuit 1250 may also function together. Suppose averaging capacitor 1240 is averaged for $K_1$ cycles, while averaging capacitor 1256 is averaged for $K_2$ cycles. Thus, each of the $K_2$ cycles includes $K_1$ averages of averaging capacitor 1240. In operation, integration capacitor 1232 is charged while switches 1236 and 242 are open. Periodically, upon the expiration of time intervals equal to the integration time, switch 1242 is closed and the charge from integration capacitor 1232 is provided to averaging capacitor 1240. This occurs $K_1$ times. This more rapidly changing, averaged (fast frame) signal may be read onto the line coupled with amplifier 1246. The signal from averaging capacitor 1240 is also provided via amplifier 1244 and transistor 1252 to additional integration capacitor 1254. Additional integration capacitor 1254 thus receives a signal that has been averaged a $K_1$ times through averaging capacitor 1240. Switch 1257 is periodically closed to allow charge from additional integration capacitor 1254 to be provided to additional averaging capacitor 1256. This occurs $K_2$ times. The signal from additional averaging capacitor 1256 may be read out on the line coupled with amplifier 1258. These operations repeat cyclically. Thus, a faster averaged signal may be output from averaging capacitor 1240, while a lower noise, further averaged signal may be output from additional averaging capacitor 1256. As a result, IR detection system 1200 may have similar benefits as IR detection system 1100. Thus, target detection, bullet trace back, detection of ultrasonic and hypersonic targets, detection of dim targets, improved resolution of distant targets and other applications may be facilitated.

Figure 13:
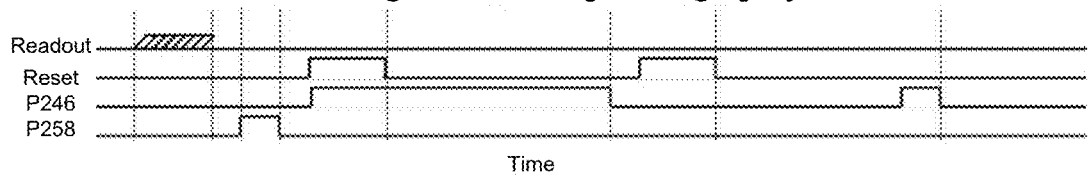
FIG. 13 depicts an embodiment of timing usable for an infrared detection system including a cascaded averaging circuit.
Figure 13:
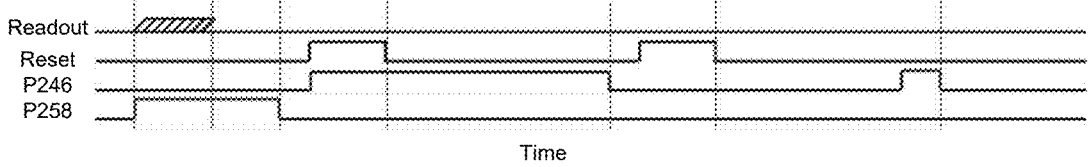

In some embodiments, precharging may be utilized. FIG. 13 depicts an embodiment of timing 1300 usable for an IR detection system including a cascaded averaging circuit, such as integration detection system 1200. Thus, timing 1300 is described in the context of infrared detection system 1200. In other embodiments, other timing may be used. Operation of infrared detection system 1200 with precharging may be explained utilizing timing 1300 as follows. As in the example above, averaging capacitor 1240 is averaged for $K_1$ cycles, while averaging capacitor 1256 is averaged for $K_2$ cycles. Thus, each of the $K_2$ cycles includes $K_1$ averages of averaging capacitor 1240. Also, in some embodiments, the clock used in timing the IR detection system may be selected to be a multiple of the sampling rate. Selecting a clock cycle that is greater than the sampling rate (e.g. the multiple of the sampling rate) may mitigate noise.

A timing cycle beings during readout of the previously completed frame's signals through amplifier 1246 (e.g. for a fast frame reading) and/or through amplifier 1258 (for a lower noise readout) onto corresponding columns lines. During this read period, additional averaging capacitor 1256 may be precharged. In addition, the averaged, integrated signal may be sampled from averaging capacitor 1240 onto additional integration capacitor 1254 through amplifier 1244. This readout is accomplished by holding switch 1257 closed during readout row selection. For the next $K_2-1$ frames out of $K_2$ frames of total cascaded averaging cycles, switch 1257 is closed only after each readout of averaging capacitor 1240 is completed. At this time additional averaging capacitor 1256 has a lower noise copy of the charge accrued by averaging capacitor 1240. Momentarily closing switch 1257 thus performs the cascaded averaging operation from capacitor 1254 onto capacitor 1256.

Between each readout period for cascaded averaging circuit 1250, readout circuit 1230 is performing a similar precharge and averaging function for $K_1$ cycles. Photodiode/pixel 1212 produces a photo signal that is integrated onto integration capacitor 1232 in response to conditions set by bias transistor 1234 and the photo signal. The period of integration is defined as the time between switch 1236 opening and switch 1242 opening in sequence. Switch 1236 is momentarily closed at the beginning of each integration cycle to empty integration capacitor 1232. Switch 1242 and switch 1257 are closed for the first cycle out of $K_1$ total integration averaging cycles in order to empty averaging capacitor 1240. In such an embodiment, $K_1$ is an integer selected to provide the desired amount of averaging. Further, for the first cycle switch 1236 is opened while switch 1242 remains closed for an extended period. Thus, averaging capacitor 1240 is precharged to a voltage close to the expected final value. Averaging capacitor 1240 may not be reset because the previous integrated voltage on averaging capacitor 1240 is typically near the final value. Not resetting and/or precharging averaging capacitor 1240 may allow faster noise settling rate and hence faster frame rates. During the next $K_1-1$ cycles switch 1242 is closed momentarily at the end of each integration period to perform the averaging operation from capacitor 1232 onto capacitor 1240.

Precharging aids in presetting the signal, for example were motion or scene changes are significant. However, in some embodiments, not resetting averaging capacitor 1240 may have an improved effect because precharging has uniformities imposed by capacitor variation and integration time adjustments. During motion of system 1200 or of targets, additional techniques to reduce blur and improve frame rate can also be utilized. Precharging allows the pixel voltage to settle closer to the new dynamically changing flux values. The ability to precharge averaging capacitor 1240 to close to its final value allows more rapid reduction of the noise on the circuits 1230 and 1250. This allows a faster frame rate out each stage of ROIC 1220. However, system 1200 can operate both utilizing precharging and without utilizing precharging. In some embodiments, the input circuit to integration capacitor 1232 may be a CTIA, buffered direct injection, source follower or other variant of input circuit. In such embodiments, averaging by capacitor 1240 and cascaded averaging circuit 1250 may still reduce noise.

Readout circuit 1230 and cascaded averaging circuit 1250 each has a settling time associated with both the noise and the ratio of the capacitance of the averaging capacitor 1240 or 1256 to the integration capacitor 1232 and 1240. In other words, the averaging capacitance divided by the integration capacitance affects the settling time for readout circuit 1230 and cascaded averaging circuit 1250. The settling time may be reduced using precharging. If IR detection system 1200 is desired to operate at high frame rate to reduce or prevent smear due to high platform motion, a small ratio of the averaging capacitance(s) to the integration capacitance(s) may be used. For slower more stationary imagery, such a fixed mounting or slow movements, a larger ratio of the averaging capacitance(s) to the integration capacitance(s) can be chosen. In some embodiment, the ratio of the capacitances of integration capacitor 1232 to averaging capacitor 1240 may be selected to match the flux of a lens, such as lens 1102, used with system 1200. In some embodiments, multiple capacitors can be utilized in place of single capacitors for the readout circuit 1230 and/or cascaded averaging circuit 1250. In such an embodiment, capacitor(s) may be selectively switched into a variable gain mode to allow a variable ratio of averaging capacitance(s) to integration capacitance(s). Even if signals are not fully settled before a particular number of integrations, system 1200 may still be utilized.

In some embodiments the fast frame output can be read from amplifier 1246 at the end of any number of cycles. Reading from amplifier 1246 may allow for adaptation to target speed while minimizing smear. In some embodiments, the output of amplifier 1246 can be used for simultaneous high dynamic range frames extending the upper level of dynamic range with periodic integration onto both the integration capacitor 1232 and averaging capacitor 1240 by keeping switch 1242 closed during a shorter integration time. For example, if $K_1=10$ fast frame cycles (number of integrations for integration capacitor 1232 before sampling) and $K_2=10$ cycles (number of integrations of integration capacitor 1254 before sampling), every full integrate cycle ($K_2$ cycles completed) corresponds to one hundred fast frame cycles. For high dynamic range if the integration time is reduced by a factor ten, then the total dynamic flux range is increased by a factor of ten for the shorter integration time. Thus, every one hundred cycles can have a high dynamic range integration inserted, with an integration time that is reduced by a factor of ten. In such an embodiment, the amount of additional high end dynamic range comes at a cost of just more than $\frac{1}{1000}^{th}$ additional time of integration within the $K_1$ and $K_2$ cycles. In some embodiments, this extends the dynamic range. The dual channel output (through amplifiers 1246 and 1258) makes this readout possible. The high dynamic range settings may be cued by the output of additional averaging capacitor 1256.

In some embodiments, $K_1$ (the number of fast fame cycles/averages for fast readout circuit 123), $K_2$ (the number of cycles/averages for cascaded averaging circuit 1230), and/or integration times (e.g. operation switches 1242 and 1257) may be set dynamically. Thus, $K_1$ and $K_2$ may be selected to account for different motion conditions in such embodiments. For stationary imaging, with low expected motion, typically $K_1$ and $K_2$ may each be between 6-20 cycles. For motion, the $K_1$ and $K_2$ cycles may be shortened progressively to mitigate smear and blurring.

Use of readout circuit 1230 in conjunction with cascaded averaging circuit 1250 may greatly increase effective well capacity, allow the sensitivity for smaller pixels 1212 to approach and exceed that of larger pixels, provide higher resolution, improve national image interpretability rating scale (NIIRS), enhance contrast and improve minimum resolvable temperature difference (MRTD). For example, ROIC 1220 may allow both medium and small pixel sensors to achieve short integration times enabling framing rates in excess of 1000 FPS. In an embodiment where averaging capacitor 1240 is not reset, the output from averaging capacitor 1240 may achieve the sensitivity of a sensor with a much longer integration time without the added area requirement of a larger capacitor. For example by not resetting capacitor 1240 the noise on the output capacitor 1240 may settle over several milliseconds of averaging to a minimum noise floor. Although not shown, a lens having a low f-number analogous to lens 1102 may be utilized.

Cascaded averaging circuit 1250 may use much smaller capacitors and still achieve significant noise reduction. For example, a capacitance ratio of the additional integration capacitance of additional integration capacitor 1254 to the additional averaging capacitance of additional averaging capacitor 1256 of 8/80 may provide the same performance as a capacitance ratio of 2/20 in noise reduction while consuming only one-fourth the area. If a smaller set of capacitors is selected, the capacitor size is chosen to not increase the KTC noise associated with smaller capacitors. This lower area utilization allows multiple cascades of averaging in the pixel 1212 or nearby the pixel 1212 creating a very compact and highly effective noise averaging mechanism.

In some embodiments, high dynamic range (HDR) can be accomplished by using the dual outputs from amplifiers 1246 and 1258 sequentially. In such embodiments, operation of IR detection system 1200 may differ. For using HDR frame timing, one out of N frames may be utilized as follows. Averaging capacitor 1240 is reset with integration capacitor 1232 by closing switch 1236 before HDR integration begins. The readout circuit 1230 is configured with switch 1242 held closed during integration. When switch 1242 is closed during integration, the input capacitance is the sum of the capacitances of integration capacitor 1232 and averaging capacitor 1240. In some embodiments, this may be approximately nine multiplied by the integration capacitance of integration capacitor 1232. A very short integration time for very high flux signal capture is used (typically a few microseconds or less) may also be used. Pixel 1212 from amplifier 1246 are read out but are not mirrored over cascaded averaging circuit 1250. Averaging capacitor 1240 is reset with integration capacitor 1232 by momentarily closing switch 1236 after HDR integration ends and pixels are read out. Reset of the readout circuit 1230 after the HDR cycle prevents signals from the HDR cycle from mixing with the low dynamic range (LDR) signal cycles. For the remainder of frames 2 though N, normal operation is utilized for readout circuit 1230 and cascaded averaging circuit 1250. This may achieve LDR for normal background flux, in a manner described in the timing for FIG. 12D. Optional precharging of averaging capacitors 1240 and 1256 may be employed is based upon the required settling time and speed of targets and movement of the sensing platform. LDR signals may be read out from amplifier 1246 and/or amplifier 1258 following each cycle, depending on speed of targets and movement of the sensing platform. In another embodiment the HDR frame may be accomplished nearly simultaneously while maintaining LDR cycles in all N frames, by adding an independent HDR fast frame circuit that does not require the use of one of the normal or LDR averaging cycle frames.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving oversampled infrared data provided from an infrared pixel array; and
   performing at least one of selective median filtering, spatial-temporal filtering, or resolution enhancement for the oversampled infrared data, comprising:
      performing the spatial-temporal filtering;
         determining a contrast for a particular pixel and a plurality of nearby pixels for the particular pixel in the infrared pixel array;
         providing a weighted average of the particular pixel and the plurality of nearby pixels based on the contrast; and
         replacing an output of the particular pixel with the weighted average.

2. The method of claim 1, wherein the selective median filtering is performed before the spatial-temporal filtering and wherein the spatial-temporal filtering is performed before the resolution enhancement.

3. The method of claim 1, wherein the contrast varies between low contrast and high contrast, a higher contrast corresponding to lower weights for the plurality of nearby pixels.

4. The method of claim 1, wherein the performing includes performing the selective median filtering, and wherein performing the selective median filtering further includes:
   ascertaining a median output for a plurality of nearby pixels of a particular pixel in the infrared pixel array;
   determining whether an output of the particular pixel is at least one of greater than a minimum threshold lower than the median output or less than a maximum threshold greater than the median output; and
   replacing the output of the particular pixel if the output of the particular pixel is not the at least one of greater than the minimum threshold lower than the median output or less than a maximum threshold greater than the median output.

5. The method of claim 1, wherein the infrared pixel array has a pitch less than ten micrometers.

6. The method of claim 5, wherein the pitch is less than five micrometers.

7. A method, comprising:
   receiving oversampled infrared data provided from an infrared pixel array; and
   performing at least one of selective median filtering, spatial-temporal filtering, or resolution enhancement for the oversampled infrared data, comprising:
      performing the resolution enhancement, comprising:
         determining a point spread function (PSF) blur based on a PSF of a lens for an infrared detection system including the lens and the infrared pixel array;
         applying, to the oversampled infrared data, an inverse filter using the PSF blur to provide filtered infrared data; and
         outputting an infrared image corresponding to the filtered infrared data.

8. The method of claim 7, wherein the inverse filter is a Wiener filter.

9. The method of claim 7, wherein the performing the resolution enhancement further includes:
   up-sampling captured oversampled infrared data to provide the oversampled infrared data,
   down-sampling the filtered infrared data to provide down-sampled, filtered infrared data, the infrared image being based on the down-sampled, filtered infrared data.

10. A system, comprising:
    a processor configured to:
       receive oversampled infrared data provided from an infrared pixel array; and
       perform at least one of selective median filtering, spatial-temporal filtering, or resolution enhancement for the oversampled infrared data, comprising to:
          perform the spatial-temporal filtering, comprising to:
             determine a contrast for a particular pixel and a plurality of nearby pixels for the particular pixel in the infrared pixel array;
             provide a weighted average of the particular pixel and the plurality of nearby pixels based on the contrast; and
             replace an output of the particular pixel with the weighted average; and
    a memory coupled to the processor and configured to provide the processor with instructions.

11. The system of claim 10, wherein the processor is configured to perform the selective median filtering, and wherein to perform the selective median filtering, the processor is further configured to:
 ascertain a median output for a plurality of nearby pixels of a particular pixel in the infrared pixel array;
 determine whether an output of the particular pixel is at least one of greater than a minimum threshold lower than the median output or less than a maximum threshold greater than the median output; and
 replace the output of the particular pixel if the output of the particular pixel is not the at least one of greater than the minimum threshold lower than the median output or less than a maximum threshold greater than the median output.

12. The system of claim 10, wherein the infrared pixel array has a pitch of not more than five micrometers.

13. A system, comprising:
 a processor configured to:
  receive oversampled infrared data provided from an infrared pixel array; and
  perform at least one of selective median filtering, spatial-temporal filtering, or resolution enhancement for the oversampled infrared data, comprising to:
   perform the resolution enhancement, comprising to:
    determine a point spread function (PSF) blur based on a PSF of a lens for an infrared detection system including the lens and the infrared pixel array;
    apply, to the oversampled infrared data, an inverse filter using the PSF blur to provide filtered infrared data; and
    output an infrared image corresponding to the filtered infrared data; and
 a memory coupled to the processor and configured to provide the processor with instructions.

14. A computer program product embodied in a non-transitory computer readable medium and comprising computer instructions for:
 receiving oversampled infrared data provided from an infrared pixel array; and
 performing at least one of selective median filtering, spatial-temporal filtering, or resolution enhancement for the oversampled infrared data, comprising:
  performing the spatial-temporal filtering;
   determining a contrast for a particular pixel and a plurality of nearby pixels for the particular pixel in the infrared pixel array;
   providing a weighted average of the particular pixel and the plurality of nearby pixels based on the contrast; and
   replacing an output of the particular pixel with the weighted average.

15. The computer program product of claim 14, wherein the selective median filtering is performed before the spatial-temporal filtering and wherein the spatial-temporal filtering is performed before the resolution enhancement.

16. The computer program product of claim 14, wherein the computer instructions performing includes performing the selective median filtering, and wherein performing the selective median filtering further includes:
 ascertaining a median output for a plurality of nearby pixels of a particular pixel in the infrared pixel array;
 determining whether an output of the particular pixel is at least one of greater than a minimum threshold lower than the median output or less than a maximum threshold greater than the median output; and
 replacing the output of the particular pixel if the output of the particular pixel is not the at least one of greater than the minimum threshold lower than the median output or less than a maximum threshold greater than the median output.

17. A computer program product embodied in a non-transitory computer readable medium and comprising computer instructions for:
 receiving oversampled infrared data provided from an infrared pixel array; and
 performing at least one of selective median filtering, spatial-temporal filtering, or resolution enhancement for the oversampled infrared data, comprising:
  performing the spatial-temporal filtering, comprising:
   determining a contrast for a particular pixel and a plurality of nearby pixels for the particular pixel in the infrared pixel array;
   providing a weighted average of the particular pixel and the plurality of nearby pixels based on the contrast; and
   replacing an output of the particular pixel with the weighted average.

18. A computer program product embodied in a non-transitory computer readable medium and comprising computer instructions for:
 receiving oversampled infrared data provided from an infrared pixel array; and
 performing at least one of selective median filtering, spatial-temporal filtering, or resolution enhancement for the oversampled infrared data, comprising:
  performing the resolution enhancement, comprising:
   determining a point spread function (PSF) blur based on a PSF of a lens for an infrared detection system including the lens and the infrared pixel array;
   applying, to the oversampled infrared data, an inverse filter using the PSF blur to provide filtered infrared data; and
   outputting an infrared image corresponding to the filtered infrared data.

* * * * *